United States Patent
Larkin et al.

(10) Patent No.: US 8,090,218 B2
(45) Date of Patent: Jan. 3, 2012

(54) IMAGING SYSTEM PERFORMANCE MEASUREMENT

(75) Inventors: Kieran Gerard Larkin, Putney (AU); Peter Alleine Fletcher, Rozelle (AU); Stephen James Hardy, West Pymble (AU)

(73) Assignee: Canon Kabushiki Kaisha, Tokyo (JP)

( * ) Notice: Subject to any disclaimer, the term of this patent is extended or adjusted under 35 U.S.C. 154(b) by 1209 days.

(21) Appl. No.: 10/598,939

(22) PCT Filed: Mar. 30, 2005

(86) PCT No.: PCT/AU2005/000445
§ 371 (c)(1),
(2), (4) Date: Jul. 11, 2007

(87) PCT Pub. No.: WO2005/096218
PCT Pub. Date: Oct. 13, 2005

(65) Prior Publication Data
US 2008/0019611 A1    Jan. 24, 2008

(30) Foreign Application Priority Data

Mar. 31, 2004 (AU) .............................. 2004901730
Mar. 31, 2004 (AU) .............................. 2004901731
Mar. 31, 2004 (AU) .............................. 2004901732

(51) Int. Cl.
*G06K 9/36* (2006.01)
(52) U.S. Cl. ........ 382/289; 382/284; 382/294; 358/540; 358/450
(58) Field of Classification Search .................. 382/190, 382/209, 219, 278, 286, 284, 291, 294; 358/537, 358/540, 450
See application file for complete search history.

(56) References Cited

U.S. PATENT DOCUMENTS

| | | | |
|---|---|---|---|
| 5,175,808 A | 12/1992 | Sayre | 395/133 |
| 5,204,944 A | 4/1993 | Wolberg et al. | 395/127 |
| 5,949,055 A | 9/1999 | Fleet et al. | 235/469 |
| 5,982,941 A * | 11/1999 | Loveridge et al. | 382/260 |
| 6,128,414 A | 10/2000 | Liu | 382/266 |
| 6,164,847 A | 12/2000 | Allen | 400/74 |
| 6,219,155 B1 | 4/2001 | Zuber | 358/1.9 |
| 6,266,452 B1 | 7/2001 | McGuire | 382/294 |
| 6,285,799 B1 | 9/2001 | Dance et al. | 382/261 |
| 6,366,316 B1 * | 4/2002 | Parulski et al. | 348/239 |
| 6,366,357 B1 * | 4/2002 | Svetkoff et al. | 356/602 |
| 6,625,315 B2 * | 9/2003 | Laumeyer et al. | 382/190 |
| 6,628,823 B1 * | 9/2003 | Holm | 382/162 |
| 6,636,216 B1 | 10/2003 | Silverbrook et al. | 345/427 |
| 7,085,401 B2 * | 8/2006 | Averbuch et al. | 382/103 |
| 2003/0002776 A1 | 1/2003 | Graves et al. | 385/16 |
| 2003/0095188 A1 | 5/2003 | Tsai et al. | 348/207.1 |

FOREIGN PATENT DOCUMENTS

| | | |
|---|---|---|
| FR | 2827460 | 1/2003 |
| GB | 2203919 | 10/1988 |
| JP | 08-201913 | 8/1996 |
| JP | 08-095371 | 12/1996 |

* cited by examiner

*Primary Examiner* — Yosef Kassa
(74) *Attorney, Agent, or Firm* — Fitzpatrick, Cella, Harper & Scinto

(57) ABSTRACT

A method (1000) of measuring performance parameters of an imaging device (120, 160) is disclosed. The method (1000) maintains a test pattern image (1005), the test pattern image (1005) comprising alignment features and image analysis features. A test chart (110, 170) containing a representation of the test pattern image is next imaged using the imaging device (120, 160) to form a second image (1010). The test pattern image (1005) and the second image (1010) are then registered using region based matching (1035) operating on the alignment features. Finally, the performance parameters are measured by analysing (1060) the image analysis features.

24 Claims, 26 Drawing Sheets

IMAGING SYSTEM PERFORMANCE MEASUREMENT

FIELD OF THE INVENTION

The present invention relates generally to the analysis of imaging systems and, in particular, to registering an image formed by the imaging system with an undistorted digital version of the image, before performing image analysis. The generation of a test chart with a dyadic pattern for use during the registration and image analysis is also disclosed.

BACKGROUND

There is a general need for measuring the performance of an imaging system. For example, it is often useful to know how certain image properties vary with scale. The results from such performance measurement may be used for selecting between alternative implementations of the imaging systems.

Until recently the measurement of the performance of imaging systems has primarily been mediated by human visual interpretation. For example, the performance of an imaging system may be measured by imaging a test chart containing a test pattern with the imaging system under test, and then comparing the properties of the test pattern appearing in the captured image with the known properties of the test pattern.

For instance, a process for determining the resolving power of a camera, which is a property of the performance of the camera, involves taking a photographic image of a standard resolution test chart and visually inspecting the image to extract from the image the resolving power of the camera. Similarly, the performance of a printing system may be measured by printing a known test pattern, and comparing the properties of the printed version of the test pattern with the properties of the test pattern.

A common property of the above described processes used for measuring the performance of an imaging system is that a test pattern with known properties is visually analysed to characterize the properties of the imaging system.

Some known test charts are designed for measuring a single property of the imaging system, such as the resolution of the imaging system, or the modulation transfer function (MTF) thereof. Other known test charts are designed for measuring multiple properties of the imaging system, with each property being measured from a separate part of the image. An example of a current process is the ISO standard 12233:2000, entitled "*Photography—Electronic still-picture cameras—Resolution measurements*", which defines a test chart with sequences of black and white bar patterns for measuring contrast over a range of spatial frequencies. The pattern on that test chart is primarily designed for human visual interpretation with most of the imaging area containing a white background with sparsely distributed single frequency patterns. Automation of the process simply mimics the human interpretation; essentially finding the highest frequency pattern with visible contrast.

A disadvantage shared by the above described processes is that only a small amount of information about the performance of the imaging system is obtained. Typically multiple different test charts have to be imaged and visually analysed to obtain different properties of the performance of the imaging system. A further disadvantage of the above described processes is that they are not amenable to automation.

Recent advances in digital and electronic imaging have meant that automated measurement of the performance of an imaging system has become more common. For example, during the evaluation of image compression processes, such as those using the JPEG and MPEG compression algorithms, a pixel-by-pixel comparison is made between an image before compression, and that after the compression process has been performed on the image. This form of measurement of the performance of an imaging system is simplified by the fact that the pixels of the images being compared are related, in that the compression process only changes pixel values, not pixel locations. In other words, no geometric distortion occurs during the compression process.

The range of image quality parameters calculable in such an imaging system is immense because, in essence, the imaging system may be considered to be an imaging system where each pixel is an independent channel. In practice a small number of mathematical image quality parameters are calculated, such as mean squared error (MSE) and peak signal to noise ratio (PSNR), as well as human visual system (HVS) related parameters. In the area of measurement of performance from digital images and video images it is almost taken for granted that the original (uncompressed) image is known and available for comparison with the compressed image.

However, in imaging situations other than pure compression, the output image cannot be directly compared to the input image because a geometrical transformation, or distortion, occurs in the imaging system. For example, when a digital camera captures an image of an ISO test pattern, the exact magnification, orientation and perspective parameters are not known a priori, nor are those parameters easily controlled or fixed, except in laboratory controlled research environments. So, in such systems it is not, in general, possible to perform a direct comparison of input and output images because the images are not congruent.

Furthermore, currently available test charts typically have different sized regions spatially ordered and separated. This kind of structure makes accurate alignment between input and output images for comparison variable, in that larger sized regions do not align well due to their lack of texture. As a result such currently available test charts can not be used to estimate geometric distortion, although their ability to estimate qualities such as colour is unaltered.

Another disadvantage shared by most currently available test charts is that they lack spatial frequency distribution, especially when compared with natural images, such as landscapes, faces, natural objects, etc. This is mainly due to the regular or grid like distribution of regions on such test charts. Accordingly, even though such test charts are useful for measuring specific qualities of an imaging system, such as the colour or regions, other properties such as resolution are difficult to estimate from the same regions.

It is often advantageous to compare corresponding regions of input and output images using higher level descriptors, such as texture, colour, spatial frequency. However, if a distortion occurred between the input image and the output image as a result of the imaging system, regions can not be compared, as such regions are not guaranteed to be corresponding regions.

SUMMARY

It is an object of the present invention to substantially overcome, or at least ameliorate, one or more disadvantages of existing arrangements.

Disclosed are arrangements which seek to address one or more of the disadvantages of existing arrangements by registering input and output images through precisely defining the geometrical transformation, or distortion, required to bring the images into congruence.

According to a first aspect of the present disclosure, there is provided a method of measuring performance parameters of an imaging device, said method comprising the steps of:

maintaining a test pattern image, said test pattern image comprising alignment features and image analysis features;

imaging a test chart using said imaging device to form a second image, said test chart containing a representation of said test pattern image;

registering said test pattern image and said second image using block based correlation operating on said alignment features; and measuring said performance parameters by analysing said image analysis features.

According to a second aspect of the present disclosure, there is provided a method of measuring performance parameters of a printer, said method comprising the steps of:

maintaining a test pattern image, said test pattern image comprising alignment features and image analysis features;

printing said test pattern image using said printer to form a test chart;

imaging said test chart using a calibrated imaging device to form a second image;

registering said test pattern image and said second image using region based matching operating on said alignment features; and measuring said performance parameters by analysing said image analysis features.

According to yet another aspect of the present disclosure, there is provided a method of generating a test pattern, said method comprising the steps of:

(a) dividing an image area into a predetermined number of areas;

(b) dividing each of said areas into smaller areas;

(c) within each area, assigning properties to at least one of said smaller areas, and designating the remainder of said smaller areas as areas;

(d) generating pixel values for said at least one of said smaller areas, said pixel values being in accordance with said properties;

(e) repeating steps (b) to (d).

According to yet another aspect of the present disclosure, there is provided an apparatus for implementing any one of the aforementioned methods.

According to yet another aspect of the present disclosure there is provided a computer program product having recorded thereon a computer program for implementing any one of the methods described above.

Other aspects of the invention are also disclosed.

BRIEF DESCRIPTION OF THE DRAWINGS

One or more embodiments of the present invention will now be described with reference to the drawings in which.

DETAILED DESCRIPTION INCLUDING BEST MODE

Figure 1:
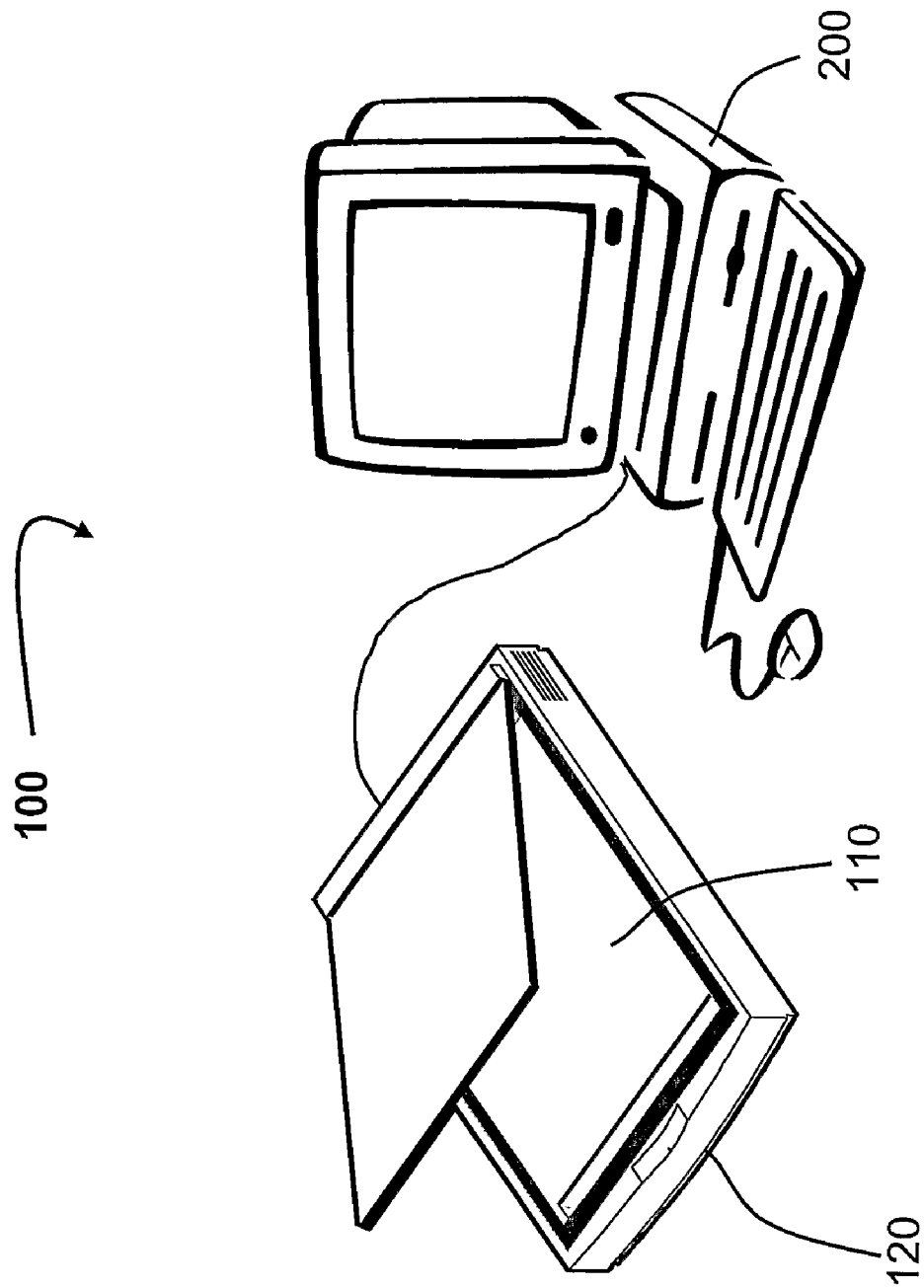
FIG. 1 illustrates an arrangement for measuring the performance of a scanning device.

Where reference is made in any one or more of the accompanying drawings to steps and/or features, which have the same reference numerals, those steps and/or features have for the purposes of this description the same function(s) or operation(s), unless the contrary intention appears.

Some portions of the description which follows are explicitly or implicitly presented in terms of algorithms and symbolic representations of operations on data within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating" "initializing", "outputting", or the like, refer to the action and processes of a computer system, or similar electronic device, that manipulates and transforms data represented as physical (electronic) quantities within the registers and memories of the computer system into other data similarly represented as physical quantities within the computer system memories or registers or other such information storage, transmission or display devices.

When evaluating a general imaging system, an image is (re-)produced by the imaging system from a master image. The two images are than compared by calculating mathematical image quality parameters. In order for the mathematical image quality parameters to be calculated, it is necessary for the images to be registered or aligned. Hence, it is necessary to precisely define the geometrical transformation, or distortion, required to bring the images into congruence. The distortion itself is also an important quality measure of the imaging system. Also, with the distortion applied by the imaging system known, attempts may be made to correct images produced by the imaging system.

Precise image registration is also a principal requirement of high quality colour printing processes where the different colour channels have to be aligned precisely. The mis-registration is usually of the simplest kind, that is to say a translation or shift in mathematical terminology. Conventionally registration marks, such as crosses, are printed on the printing medium and just outside the main image area in an attempt to achieve precise registration of the colour channels. The crosses are usually composed of two thin lines which clearly show any misalignment of the printed colour channels.

All alternative approach is to include alignment patterns, not spatially localised patterns like crossed lines, but distributed patterns like spread spectrum noise or mathematical patterns with special spatial and spectral properties, into the test pattern. Such alignment patterns may be embedded at low levels, so that they are not necessarily visible to the human eye, yet are still detectable by mathematical procedures such as matched filtering or correlation.

Unlike the printing process where the distortion is a relative translation between channels, the distortion occurring in more general imaging systems, such as a camera, may also vary spatially. In fact, the most common types of distortion in cameras depend on the lens of the camera. Such distortions include barrel or pin-cushion distortion, and perspective distortion. If the outward radial distortion increases with the distance from the image centre the distortion is called pin-cushion distortion, whereas if the inward distortion increases with distance from the image centre then the distortion is called barrel distortion.

Using traditional methods, it would be necessary to include registration marks throughout the image area to allow complete image registration. This is possible, and indeed some of the test patterns described below include registration marks throughout the test pattern, which is then imaged. However, it is not necessary to explicitly embed such registration marks into the test pattern if the test pattern itself has a structure which may be called an "intrinsically alignable structure". Mathematical analysis of alignment processes shows that test patterns in an image are intrinsically alignable if the test patterns have a wide Fourier spectral content. In particular, a wide Fourier spectral content ensures that correlation based registration gives sharp, low noise alignment.

From the preceding discussion it is clear that the use of a suitable test pattern may allow both precise image alignment and image quality metric evaluation on a pixel-to-pixel basis. One of the significant advantages of such an approach is that a correlation-based alignment process may be used, which is perfect for automation.

FIG. 1 illustrates an arrangement 100 for measuring the performance of a scanning device, such as digital scanner 120. The digital scanner 120 may be any type of digital scanner, such as a flatbed scanner, a photocopier with scanner functionality, a drum scanner or the like. The digital scanner 120 interfaces to a general purpose computer 200.

Figure 4:
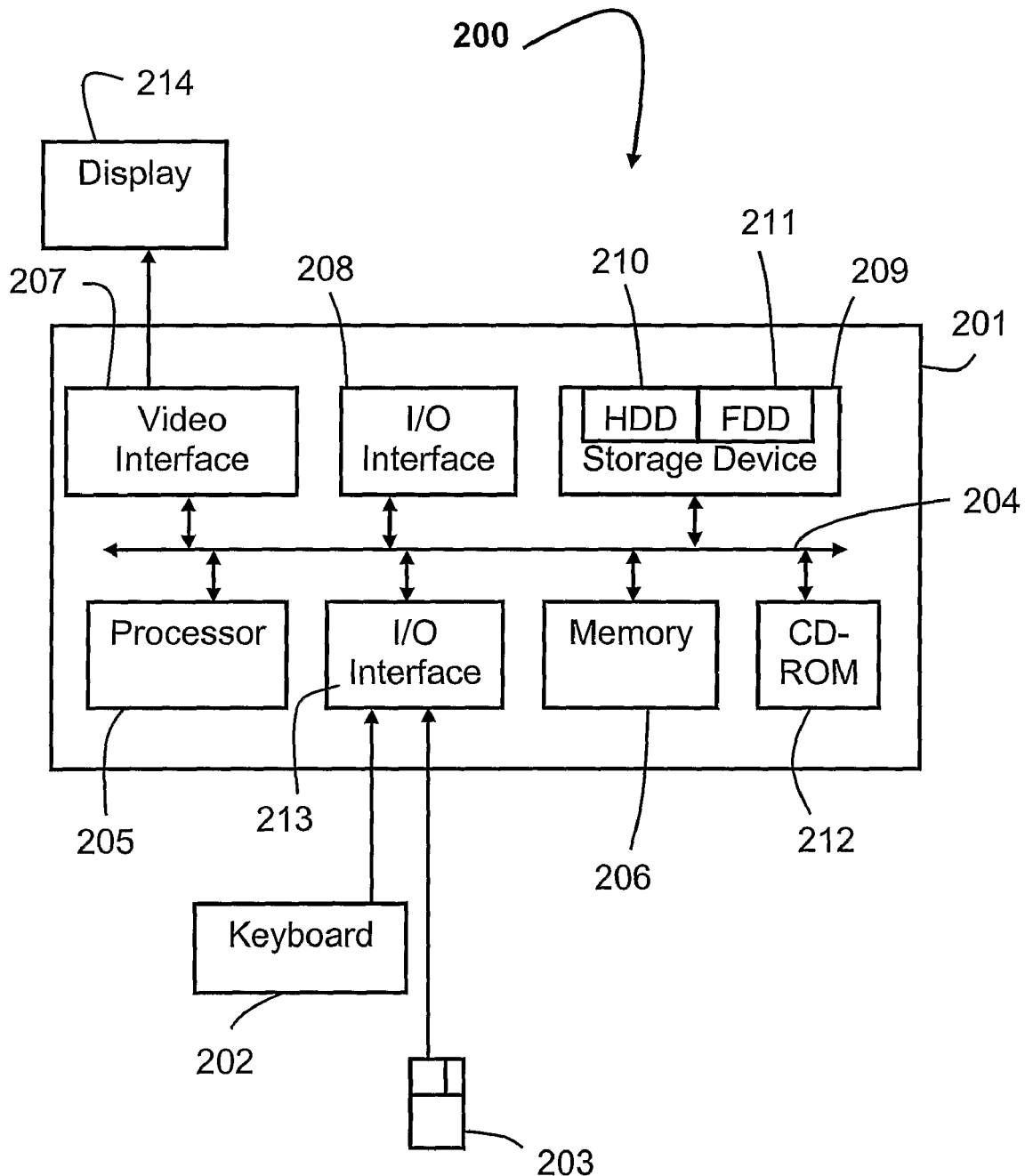
FIG. 4 shows a schematic block diagram of the general-purpose computer.

FIG. 4 shows a schematic block diagram of the general purpose computer 200. The computer 200 is formed by a computer module 201, input devices such as a keyboard 202 and mouse 203, and a display device 214. The computer module 201 typically includes at least one processor unit 205, and a memory unit 206. The module 201 also includes an number of input/output (I/O) interfaces including a video interface 207 that couples to the display device 214 and loudspeakers 217, an I/O interface 213 for the keyboard 202 and mouse 203, and an interface 208 for interfacing with devices external to the computer 200, such as the digital scanner 120 (FIG. 1).

A storage device 209 is provided and typically includes a hard disk drive 210 and a floppy disk drive 211. A CD-ROM drive 212 is typically provided as a non-volatile source of data. The components 205 to 213 of the computer module 201, typically communicate via an interconnected bus 204 and in a manner which results in a conventional mode of operation of the computer system 200 known to those in the relevant art.

Referring to FIGS. 1 and 4, the arrangement 100 is controlled so that the digital scanner 120 scans a calibrated test chart 110 containing a test pattern to form a digital image of the test pattern. An advantage of using test charts instead of images containing natural scenes when performing image quality assessment is that control is gained over the structure of the input image because, as is well known from video sequence analysis theory, image registration is generally difficult in image regions having little texture. By appropriate design of the pattern appearing on the test charts, adequate texture can be assured in image regions that require registration.

The digital image of the test pattern is typically stored on the memory 206 of the general purpose computer 200. The general purpose computer 200 also holds in its memory 206 a digital representation of the test pattern appearing on the test chart 110 as a test pattern image. Both images, those being the image formed by the scanner 120 from the test chart and the test pattern image, are stored in the memory 206 as a raster array of pixel values of some fixed precision or floating point data type with a horizontal and vertical dimension. The images are generally colour images, though the registration process described below is generally applied to only a single channel derived from the other channels, such as the luminance of the image.

The calibrated test chart 110 is produced beforehand from the test pattern through a process such as printing, etching, or other means. To be useful in the analysis of the performance of an imaging system, the calibrated test chart 110 must be produced by a sufficiently accurate process such that the spatial errors in the calibrated test chart 110 are much smaller than those expected from the imaging system. Etching is preferably used for measuring the performance of the scanner 120 where high precision is required, such as the measurement of the modulation transfer function (MTF) of the scanner 120, whereas printing is used for producing test charts 110 for use in the measurement of characteristics that require less precision.

After obtaining a digital image of the test pattern on the test chart 110 using the scanner 120, the general purpose computer 200 is then controlled to register the digital image from the scanner 120 and the test pattern image, and to analyse the registered images in order to determine at least one characteristic of the scanner 120. The method used for registering and analysing the images is described in detail below.

Figure 2:
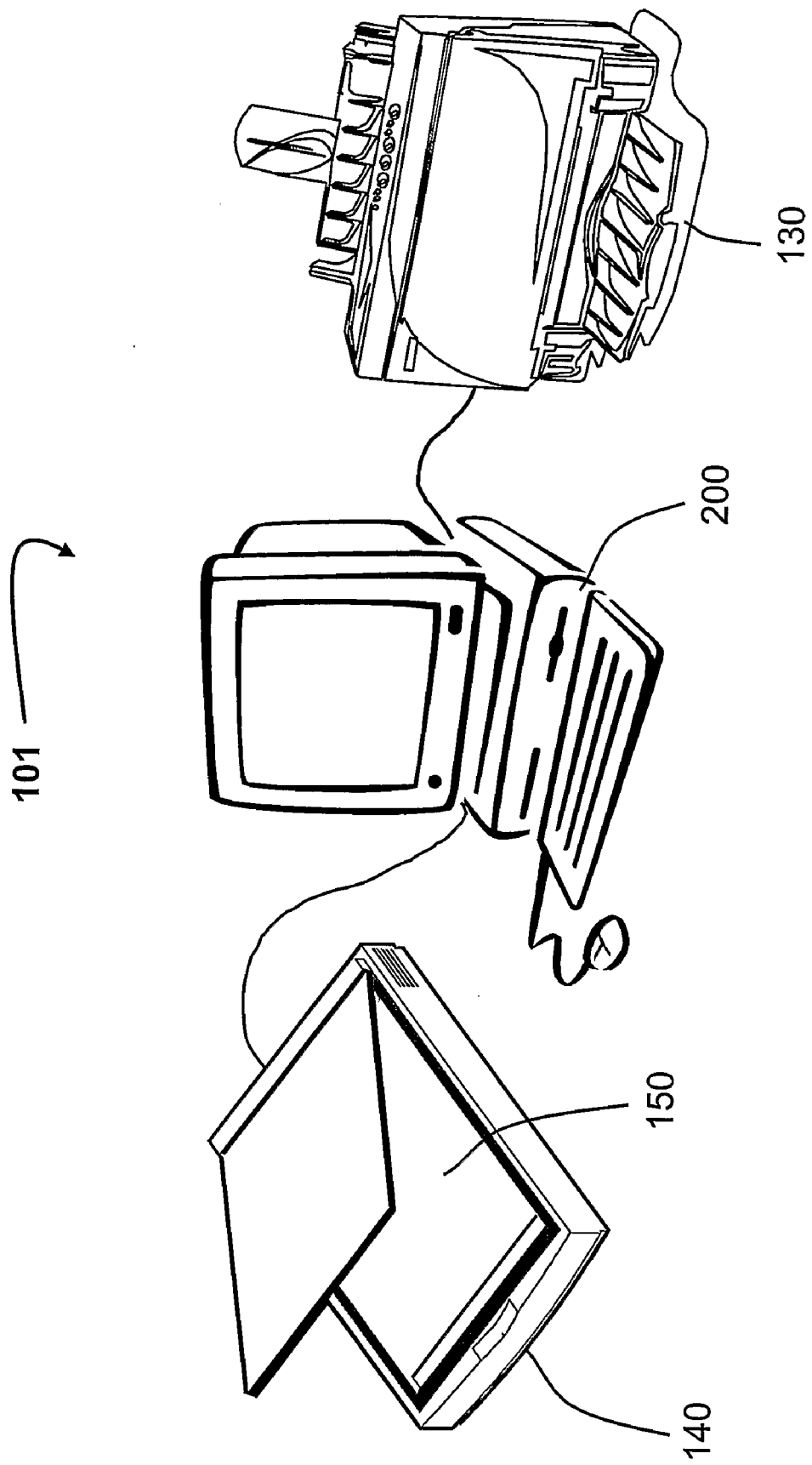
FIG. 2 illustrates an arrangement for measuring the performance of a printer.

FIG. 2 illustrates an arrangement 101 for measuring the performance of a printer 130. The printer 130 may be any type of printer, such as a laser beam printer, an inkjet printer, a dye sublimation printer or the like. In this arrangement 101 the printer 130, as well as a calibrated digital scanner 140, are interfaced to the general purpose computer 200, described in detail with reference to FIG. 4, through I/O interface 208.

In operation the printer 130 receives a test pattern from the computer 200 and prints a test chart 150 containing the test pattern. The test chart 150 is then scanned using the calibrated scanner 140 in order to form a digital image of the test pattern, which is typically stored on the memory 206 of the general purpose computer 200.

The general-purpose computer 200 is then controlled to register the digital image from the calibrated scanner 140 and an image of the test pattern, and to analyse the registered images in order to determine at least one characteristic of the printer 130. The method used for registering and analysing the images is described in detail below.

Figure 3:
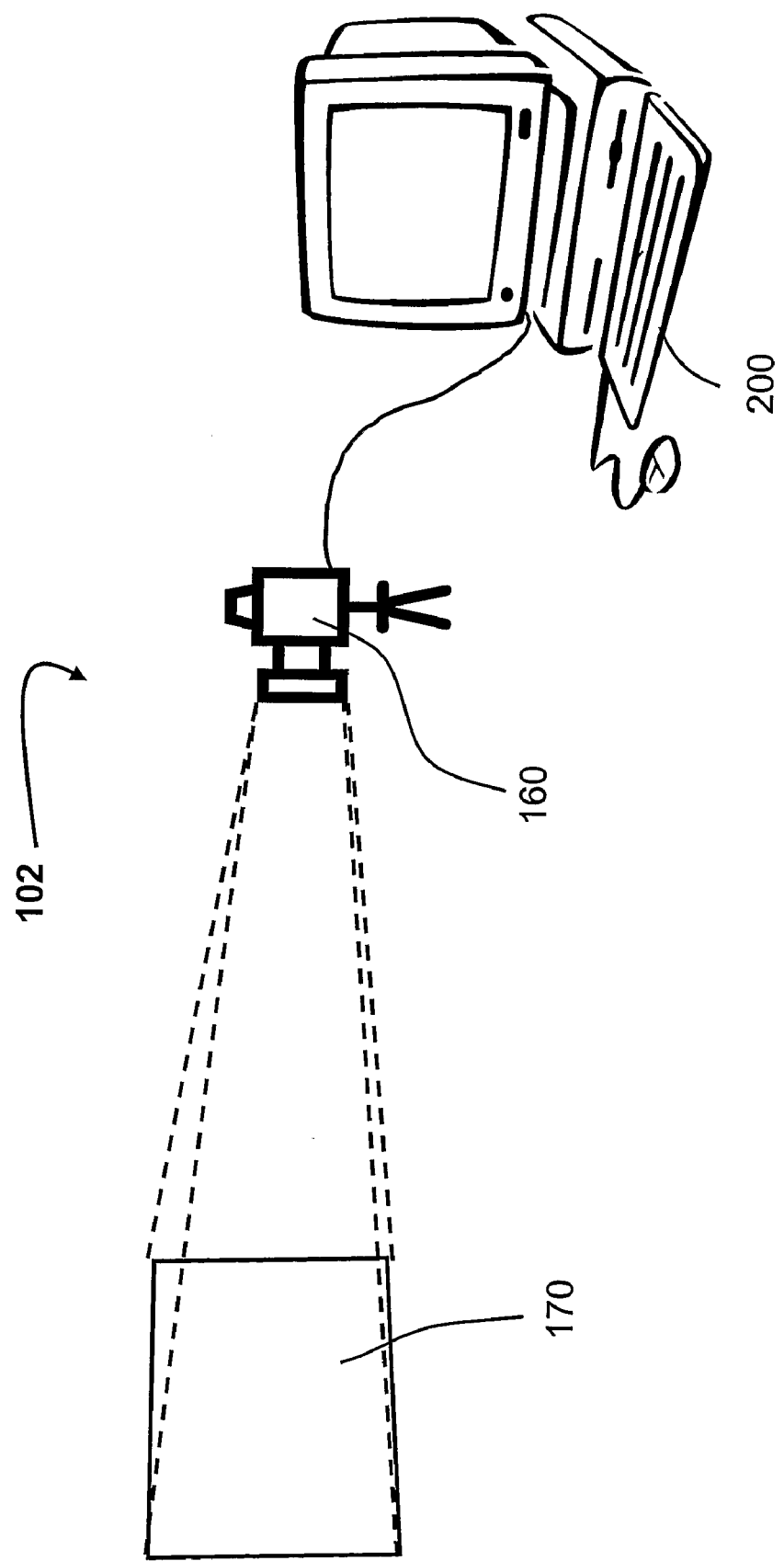
FIG. 3 illustrates an arrangement for measuring the performance of the optical imaging system of a camera.

FIG. 3 illustrates an arrangement 102 for measuring the performance of the optical imaging system of a camera 160. In this arrangement 102 the camera 160 interfaces with the general-purpose computer 200 through I/O interface 208.

The camera 160 is controlled to capture an image of a calibrated test chart 170 containing a test pattern. The calibrated test chart is formed in the manner described with reference to FIG. 1. The image of the calibrated test chart is then transferred to the general purpose computer and stored in memory 206. The general-purpose computer 200 is then controlled to register the image from the camera 160 and an image of the test pattern appearing on the calibrated test chart, and to analyse the registered images in order to determine at least one characteristic of the optical imaging system of the camera 160. The method used for registering and analysing the images is described in detail below.

In arrangement 102 it is possible to use a self-luminous device, such as a liquid crystal display (LCD) or cathode ray tube (CRT) display, instead of a more conventional reflective or transmissive test chart which requires external illumination. In fact, the LCD or CRT display may be the display device 214 shown in FIG. 4 and forming part of the general computer system 200. A major advantage of using an LCD as test chart 170 is that LCD's are fabricated by micro-lithographic techniques on flat glass, which ensures extremely good dimensional accuracy and stability, especially when compared to printed test charts. An advantage of using either of the LCD or CRT display as test chart 170 is that changing the test pattern is just a matter of changing the signal sent to the display, so that numerous different test patterns may be used. It is also possible to rapidly display a sequence of different test patterns.

In an arrangement not illustrated the performance of the optical imaging system of an analogue (film) camera may be measured by capturing a photograph of the calibrated test chart 170, developing the photograph, then scanning the photograph using a calibrated scanner such as scanner 140 (FIG. 2) to form an image of the test pattern on the calibrated test chart, registering the image of the test pattern on the calibrated test chart and an image of the test pattern, and analysing the registered images in order to determine at least one characteristic of the optical imaging system of the analogue camera.

It can be seen that in each of the arrangements described with reference to FIGS. 1 to 3 two images are formed, a first being a digital representation of a generated test pattern, and the second being a captured image containing the same test pattern. The precise format of the test pattern used in each instance depends on the characteristic of the imaging system that is to be measured.

Before describing the steps of registering the images and analysing the registered images in order to determine characteristic of the imaging system under test, be it the scanner 120 (FIG. 1), the printer 130 (FIG. 2), the optical imaging system of the camera 160 (FIG. 3), or the optical imaging system of the analogue camera (not illustrated), the generation of a number of test patterns for use in the registration and analysis of the images is first described.

The methods of generating test patterns are preferably practiced using the general-purpose computer 200 shown in FIG. 4 wherein the processes of generating the test patterns are implemented as software, such as an application program executing within the computer 200. In particular, the steps of generating the test patterns are effected by instructions in the software that are carried out by the computer. Typically the application program is resident on the hard disk drive 210 and read and controlled in its execution by the processor 205. Intermediate storage of the program and the storage of the generated test pattern may be accomplished using the memory 206, possibly in concert with the hard disk drive 210.

Each of the test patterns is generated by the general-purpose computer 200 as a digital image, which is defined on a raster grid of N pixels by M pixels in the horizontal and vertical directions respectively. Each pixel of the test patterns is generally a colour pixel in some colour space, such as a linear RGB or CMYK colour space. Pixel values are preferably integer values in the range of 0 to 255. The test pattern may be converted to a single channel image based on the luminance of the colour pixels.

Two coordinate systems are defined for the test pattern images. The first is an offset coordinate system where the location of each pixel is measured relative to the upper left corner of the image. The second is a Cartesian coordinate system where the x-axis is along the horizontal dimension of the image, the y-axis is along the vertical dimension of the image, a unit displacement in the Cartesian coordinates represents a single pixel displacement on the image, and the origin of the Cartesian coordinates lies at pixel offset $$\left(\left\lfloor\frac{N}{2}\right\rfloor, \left\lfloor\frac{M}{2}\right\rfloor\right).$$

Note that where the Fourier Transform is used, it is assumed that the origin of the Fourier Transform is at the origin of the Cartesian coordinates. This means that the DC value of the Fourier Transform is positioned at pixel offset $$\left(\left\lfloor\frac{N}{2}\right\rfloor, \left\lfloor\frac{M}{2}\right\rfloor\right),$$

and the Nyquist frequency (for images with even width and height) is positioned at pixel offset (0,0). The forward and inverse Fourier Transforms are normalised such that the inverse Fourier Transform is divided by a scaling factor of 1/(N×M) and the forward Fourier Transform has a scaling factor of unity (no scaling).

Also, where interpolation is used throughout, it is assumed that half sample symmetric reflective boundary conditions are used to extend the image to allow interpolation of pixels at the edge of the image.

The first test pattern described here is a test pattern used in determining spatial inaccuracies in the imaging system under test. The test pattern consists of two superimposed patterns, those being an alignment pattern, and a pseudo-random noise pattern.

Figure 5:
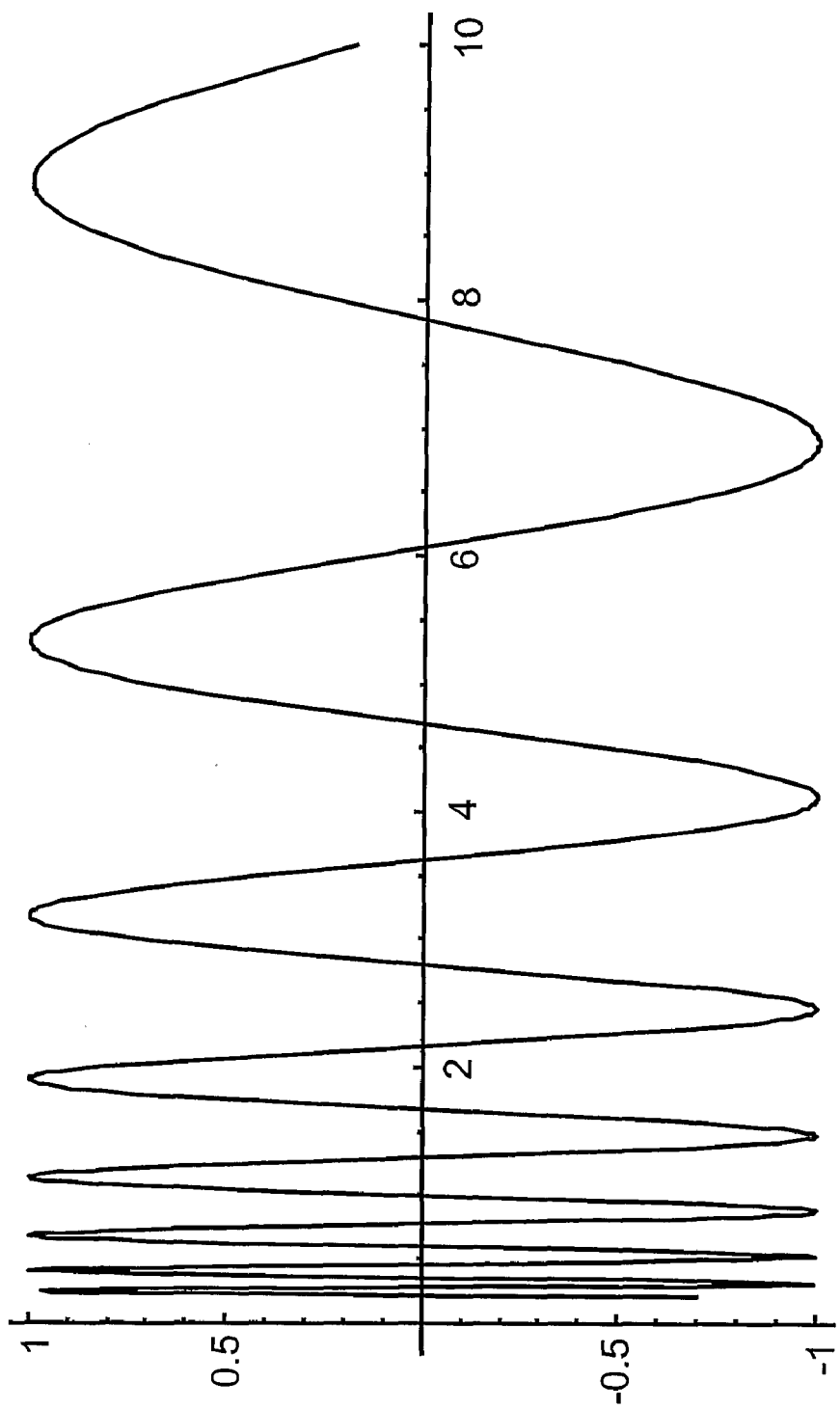
FIG. 5 shows an example one-dimensional scale invariant pattern.
Figure 6:
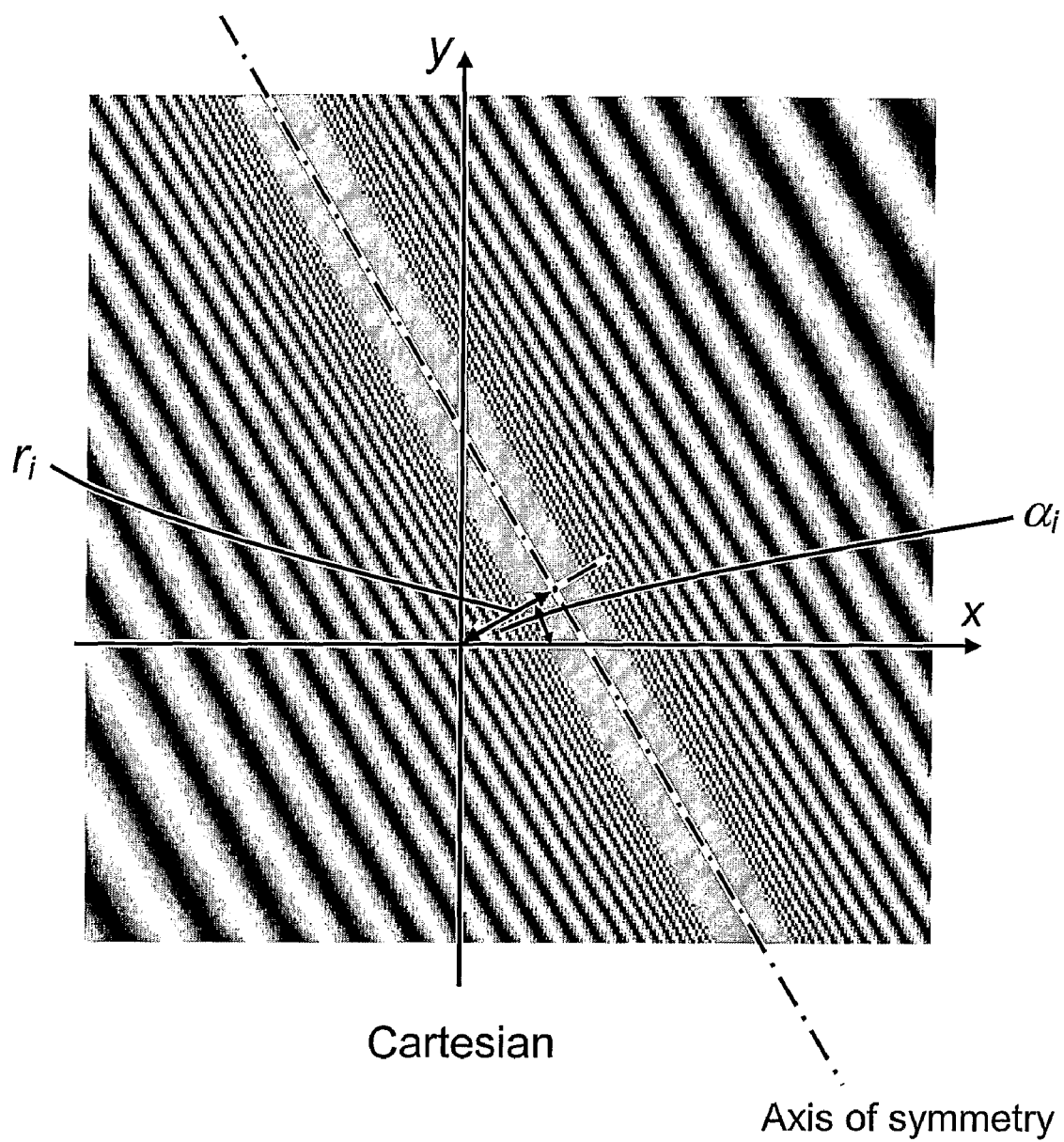
FIG. 6 shows a representation of an example of a one-dimensional scale invariant pattern extended in the transverse direction to cover a defined image area.
Figure 7:
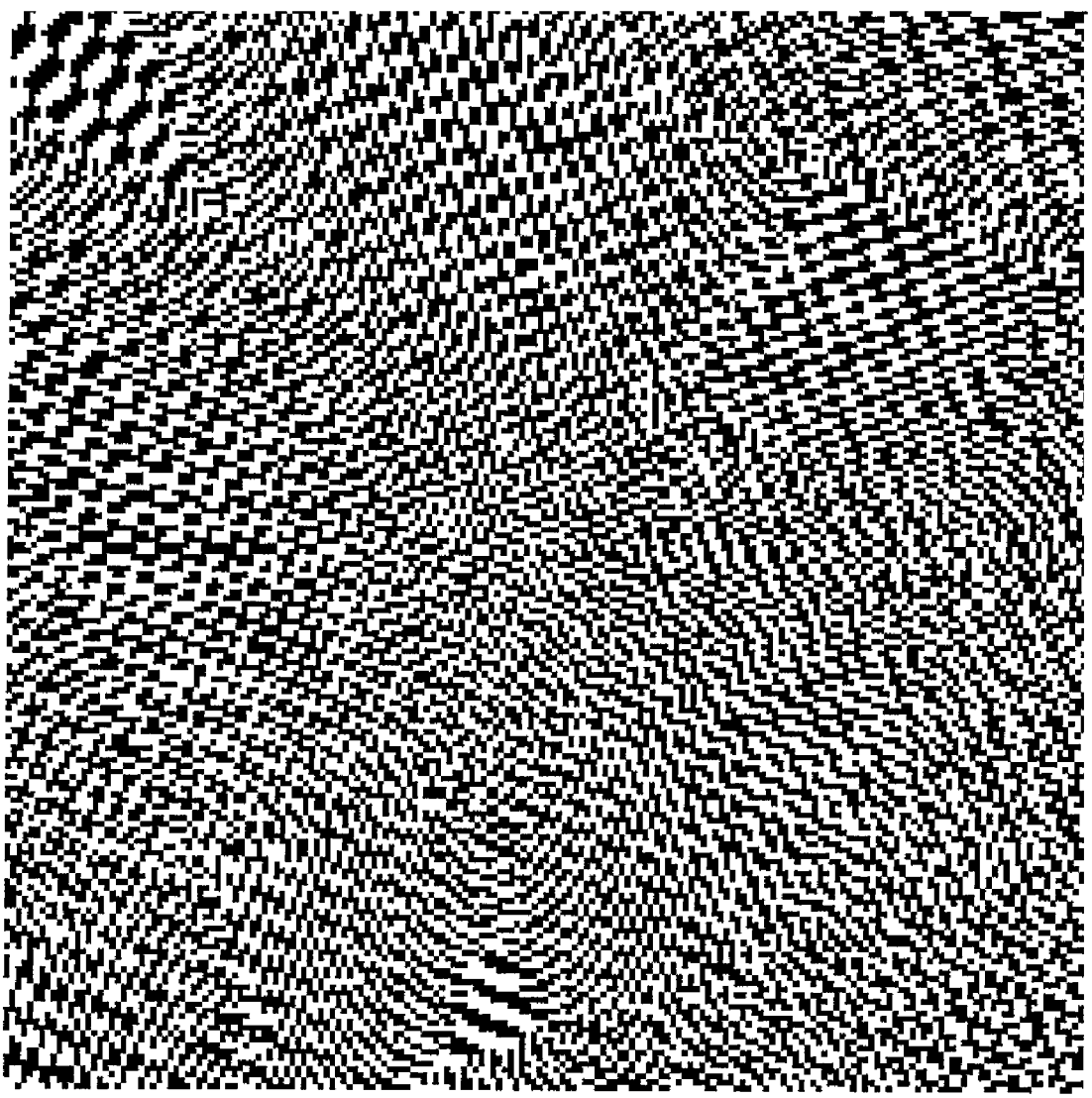
FIG. 7 shows an example alignment pattern image, which is a superposition of four one-dimensional scale invariant patterns, each similar to the example one-dimensional scale invariant pattern shown in FIG. 6 but with different radius $r_i$ and angle $\alpha_i$ parameters.

The alignment pattern in turn is a superposition of four one-dimensional scale invariant patterns, with each one-dimensional scale invariant pattern extended in a transverse direction to cover a defined image area. A one-dimensional basis function from which each one-dimensional scale invariant pattern may formed is:

$$f(x) = \cos(\gamma \log|x - x_0|) \quad (1)$$

where $\gamma$ is a constant that specifies how quickly the pattern oscillates and $x_0$ specifies the symmetry point for the pattern. The reason the basis function is termed a "scale invariant" pattern is because the pattern, when correlated with a scaled version thereof, still forms a correlation peak. An example one-dimensional scale invariant pattern is represented in FIG. 5. Each one-dimensional scale invariant pattern $f_i(x,y)$ that has been extended in the transverse direction is specified by two further parameters, namely a radius $r_i$, and an angle $\alpha_i$, as follows:

$$f_i(x,y) = \cos(\gamma \log|x \cos\alpha_i + y \sin\alpha_i - r_i|) \quad (2)$$

wherein the angle $\alpha_i$ is the angle an axis of symmetry of the scale invariant pattern $f_i(x,y)$ forms with the vertical Cartesian axis, and the radius $r_i$ is the distance from the Cartesian origin to the axis of symmetry. Each one-dimensional scale invariant pattern $f_i(x,y)$ also has a Nyquist radius, which is the number of pixels from the axis of symmetry of the pattern where the frequency of the pattern is equal to the Nyquist frequency of the image. Pixel values within the Nyquist radius from the axis of symmetry are attenuated. An example of a one-dimensional scale invariant pattern $f_i(x,y)$ extended in the transverse direction to cover the image area is shown in FIG. 6, together with the parameters radius $r_i$ and angle $\alpha_i$, and the axis of symmetry. A representation of an example alignment pattern image, which is a superposition of four one-dimensional scale invariant patterns $f_i(x,y)$, each similar to the example one-dimensional scale invariant pattern shown in FIG. 6 but with different radius $r_i$ and angle $\alpha_i$ parameters, is shown in FIG. 7. In the representation pixel values have been binarized.

The preferred values of the radius $r_i$ and angle $\alpha_i$ parameters for the one-dimensional scale invariant patterns are:

$$r_1 = P_d, \alpha_1 = \frac{9}{16}2\pi \quad (3)$$

$$r_2 = P_d, \alpha_2 = \frac{13}{16}2\pi$$

$$r_3 = P_d, \alpha_3 = \frac{3}{16}2\pi$$

$$r_4 = \frac{P_d}{\sqrt{2}}, \alpha_4 = \frac{15}{16}2\pi$$

with $$P_d = \max(256, \min(N, M))/(2 + \sqrt{2}) \quad (4)$$

and where the Nyquist radius is $R_{NYQ}=50$. This set of parameters $r_i$ and $\alpha_i$ has been specially chosen so that the axes of symmetry of the one-dimensional scale invariant patterns $f_i(x,y)$ intersect at points that define line segments that have certain ratios of lengths. The ratios of lengths are invariant under affine transformations.

Figure 8:
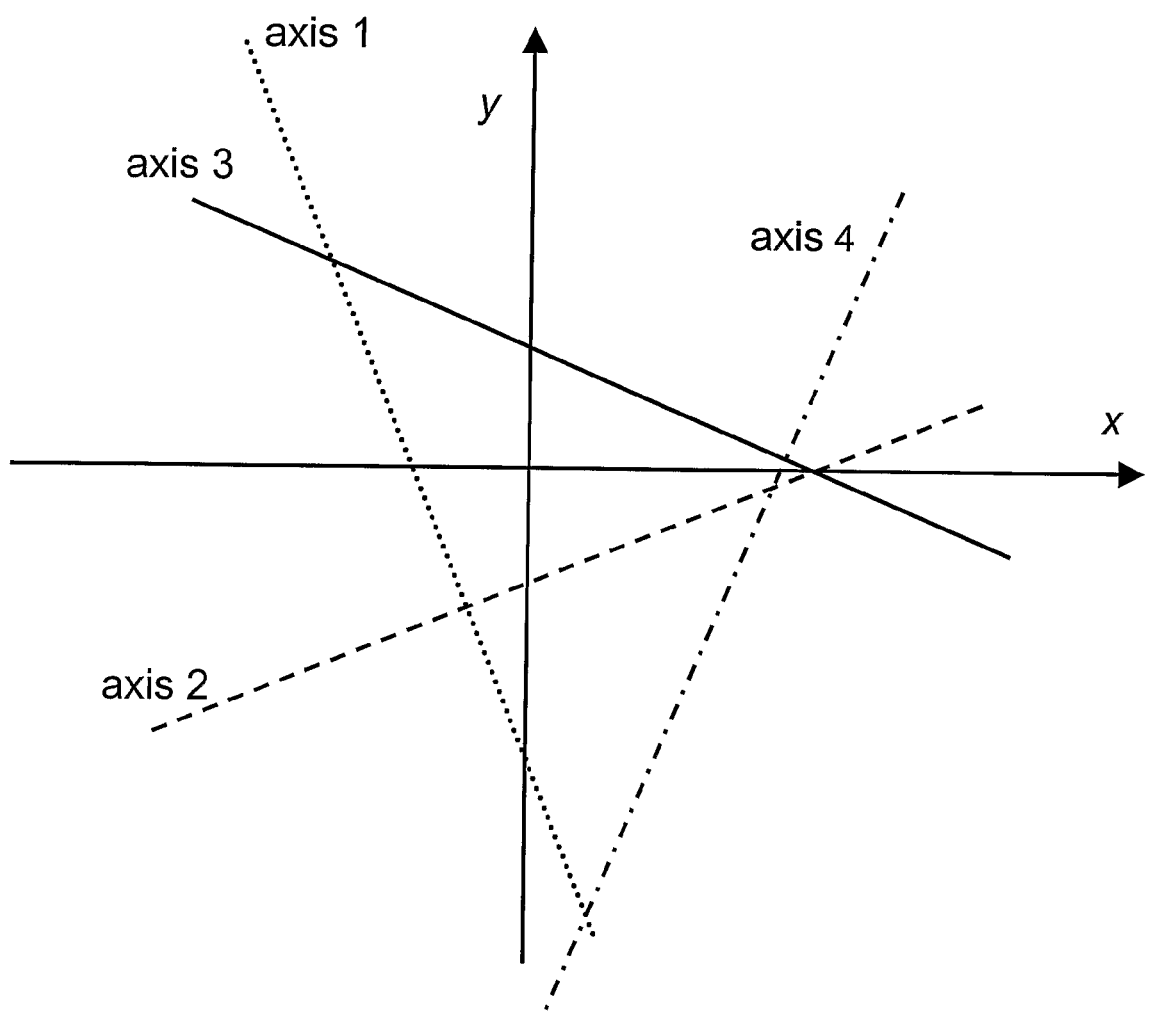
FIG. 8 shows the preferred configuration the axes of symmetry of four one-dimensional scale invariant pattern embedded in the alignment pattern shown in FIG. 7.

From the preferred parameters above, the configuration of the axes of symmetry of the four one-dimensional scale invariant patterns $f_i(x,y)$ embedded in the alignment pattern is shown in FIG. 8.

For a test pattern with dimensions N pixels by M pixels, the following quantities are pre-calculated for each one-dimensional scale invariant pattern $f_i(x,y)$ having parameters $r_i$ and $\alpha_i$:

$$D_i = \cos\left(\frac{\pi}{2}\mathrm{frac}\left(4\left(\alpha_i + \frac{1}{8}\right)\right) - \frac{\pi}{4}\right) \quad (5)$$

$$X_i = \left\lfloor\frac{N}{2}\right\rfloor + r_i\cos\alpha_i$$

$$Y_i = \left\lfloor\frac{M}{2}\right\rfloor + r_i\sin\alpha_i$$

$$R_i = -(X_i\cos\alpha_i + Y_i\sin\alpha_i)/D_i$$

$$R_d = R_{NYQ}\max(256, \min(N, M))/256$$

The contribution of pattern $f_i(x,y)$ to the pixel of the alignment pattern at offset (x,y) is $P_i(x,y)$, and is given by:

$$R = R_i + (y\sin\alpha + x\cos\alpha)/D_i \quad (6)$$

if $(|R| > R_{NYQ}$ and $|R| > R_d)$ $$P_i(x, y) = \left(\frac{|R|}{R_d}\right)^{-0.5}\cos(\pi R_{NYQ}\log(|R|))$$

elseif $(|R| > R_{NYQ}$ and $|R| <= R_d)$ $$P_i(x, y) = \cos(\pi R_{NYQ}\log(|R|))$$

else $$P_i(x, y) = 0$$

The pixel values of the alignment pattern are then calculated as follows:

$$P(x, y) = \sum_{i=1}^{4} P_i(x, y) \quad (7)$$

The test pattern is generated by adding the raster array of real values representing the alignment pattern, that is P(x,y), to a pseudo-random noise pattern. The preferred generator of the pseudo-random noise pattern generates values in the range −1 to 1, and the test pattern value at coordinate (x,y), denoted RGB(x,y), may be obtained through:

$$t(x,y) = (\text{random}(x,y,s) + 0.025 P(x,y))$$

$$t_{max} = \max(t(x,y))$$

$$t_{min} = \min(t(x,y))$$

$$Y(x,y) = 256(t(x,y) - t_{min})/(t_{max} - t_{min})$$

$$RGB(x,y) = (\lfloor Y(x,y) \rfloor, \lfloor Y(x,y) \rfloor, \lfloor Y(x,y) \rfloor) \quad (8)$$

where random(x,y,s) represents the random value generated for the pixel at coordinate (x,y) and using seed value s. Hence an RGB pixel value is formed for each pixel in the test pattern, the RGB pixel value representing a grey level that is determined by adding 0.025 times the alignment pattern pixel value P(x,y) to the random number generated for that pixel, and then renormalising and quantising the entire image so that it takes on integer values between 0 and 255.

Figure 9:
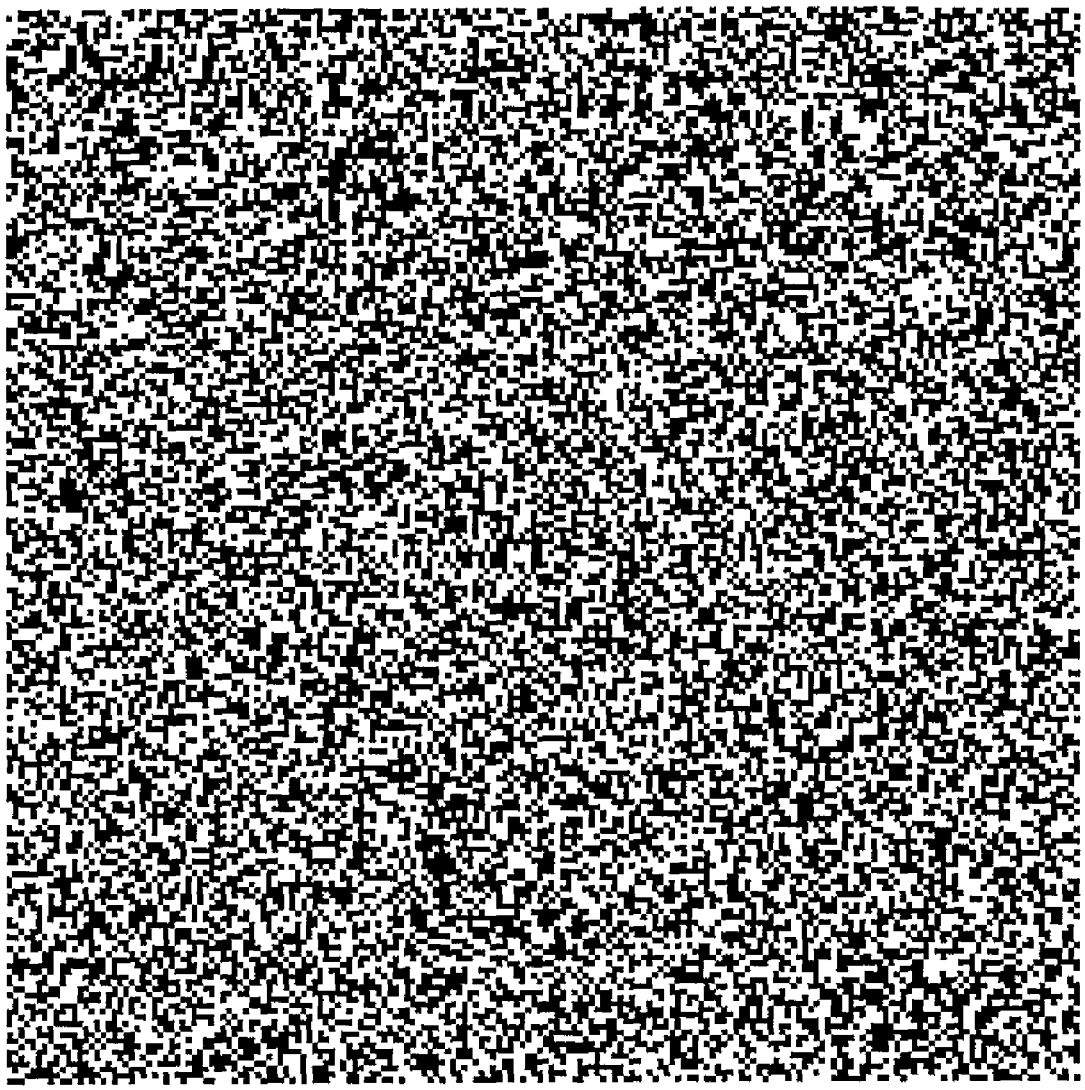
FIG. 9 shows an example test pattern that consists of both a spread-spectrum alignment pattern and a high frequency noise pattern.

The test pattern generated using the process described above is a grey scale test pattern that has both a spread-spectrum alignment pattern that may be used to determine approximate translation, rotation and scaling transformations of the captured test pattern efficiently, and a high frequency noise pattern, generated by the pseudo-random noise generator, that allows very fine spatial registration. A binarized representation of an example test pattern is shown in FIG. 9.

Translation, rotation and scaling are known as affine transformations. A property of affine translations is that lines are transformed to lines. Accordingly, when the axes of symmetry of the patterns forming the alignment pattern undergo an affine transformation, then the transformed alignment pattern will still have axes of symmetry therein, with only the configurations of the axes of symmetry of the respective patterns transformed to different configurations.

Figure 10:
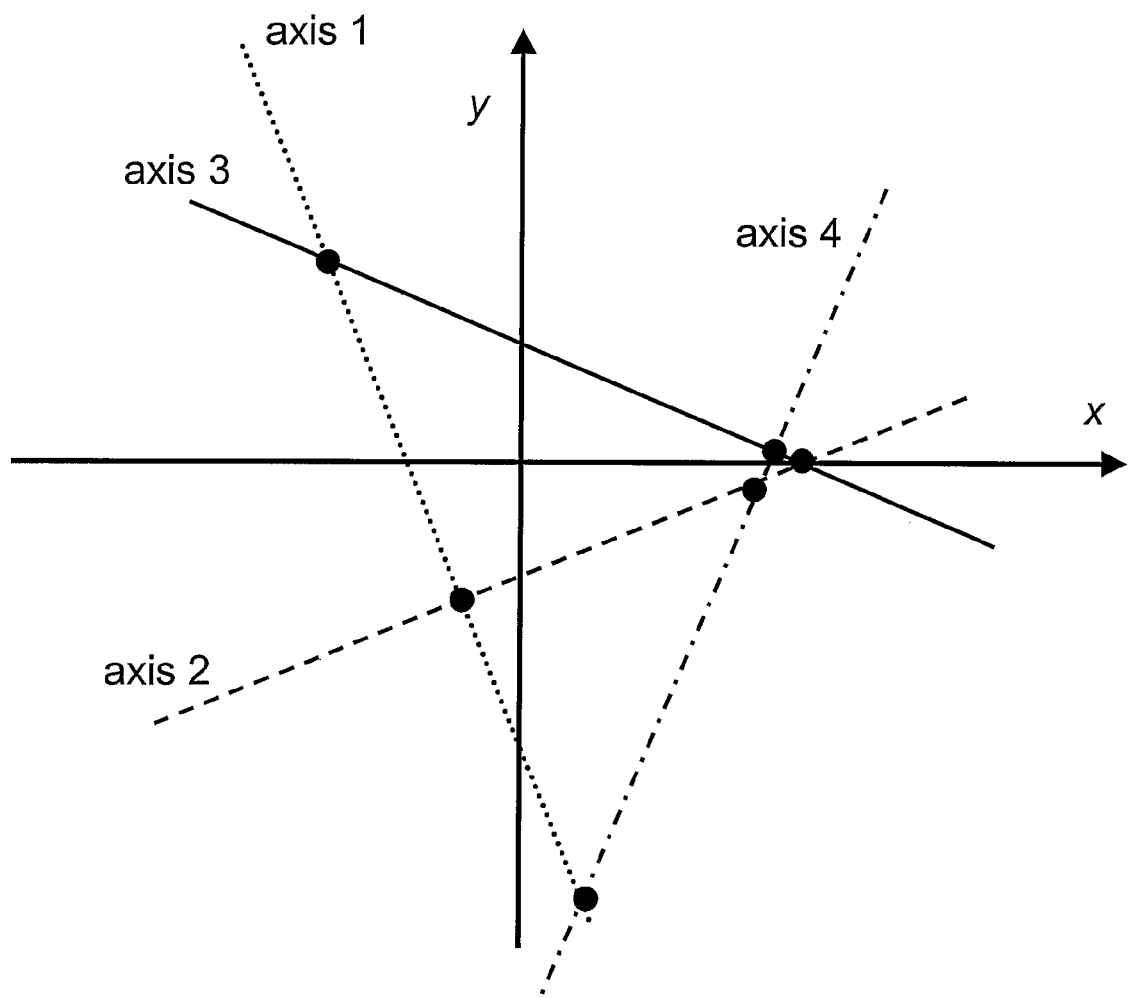
FIG. 10 shows the intersection points of the axes of symmetry shown in FIG. 8.

The pattern detection process described below uses this property of affine transformation by identifying the positions and angles of the axes of symmetry in the transformed alignment pattern, allowing the determination of parameters defining the affine transform that has been applied to the image containing the alignment pattern. Rather than analyse the parameters of the axes of symmetry directly, the method described below analyses the points of intersection of the axes of symmetry, which are shown in FIG. 10, and in particular the ratios of line lengths joining the points of intersection of the axes of symmetry, which are invariant to affine transformations.

As noted, the test pattern generated using the process described above is a grey scale test pattern. In the case where different colour channels are to be aligned, such as the case where the CMYK colour space channels of a printer are to be aligned, it is necessary to use a test pattern containing pixels in the CMYK colour space. Accordingly, the grey scale test pattern described above has to be converted into a colour test pattern.

Figure 23:
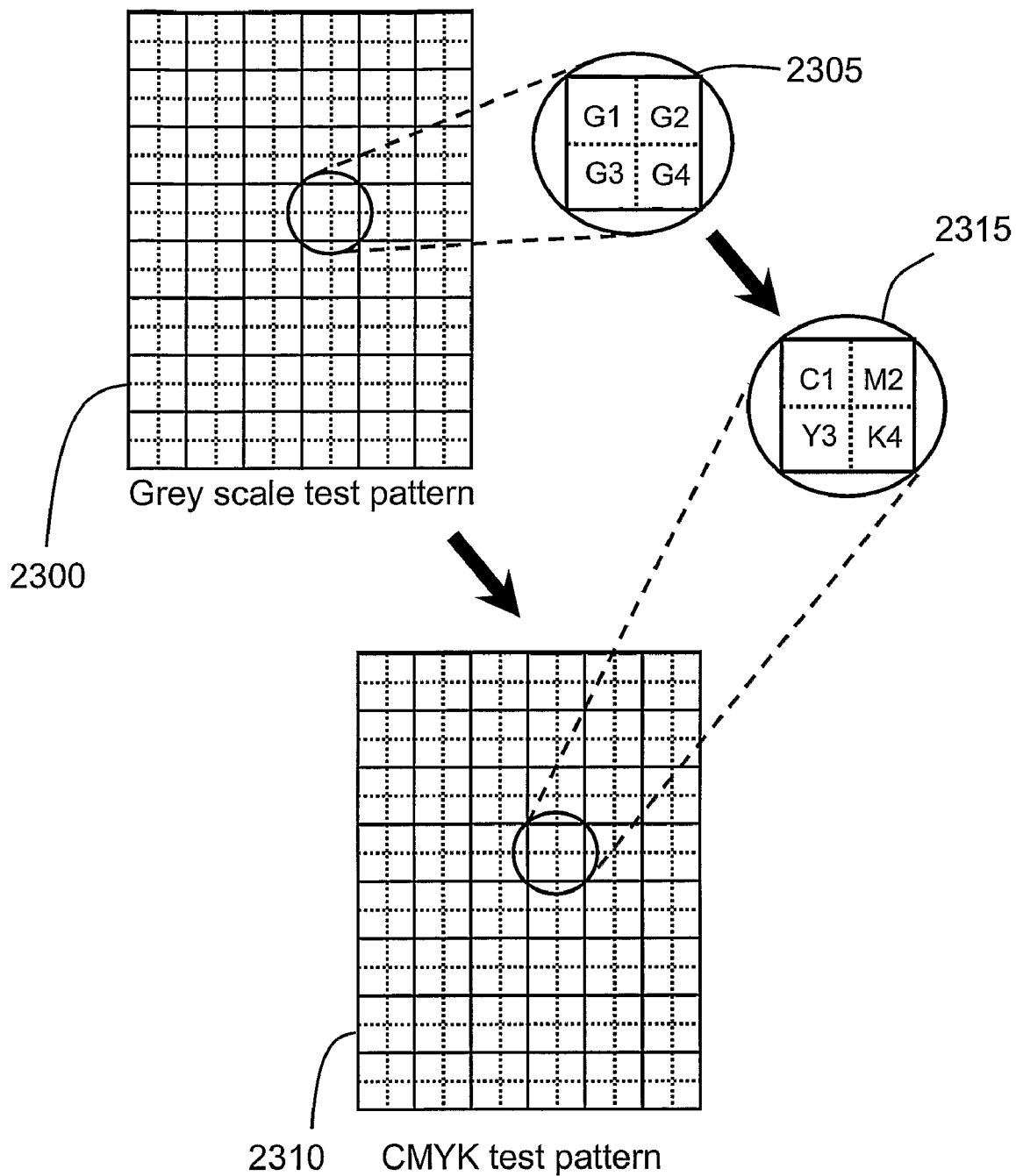
FIG. 23 illustrates the conversion from a grey scale test pattern to a CMYK test pattern.

The conversion starts by the processor 205 dividing the grey scale test pattern into a set of 2 by 2 pixel cells. FIG. 23 illustrates the conversion from a grey scale test pattern 2300 to a CMYK test pattern 2310. In each of the cells the pixels are labelled as G1, G2, G3, and G4 for the top left, top right, bottom left and bottom right pixels respectively. Item 2305 shows one such set of 2 by 2 pixel cells, and the labelling of pixels within the cell.

Corresponding pixels in the test pattern containing pixels in the CMYK colour space are labelled as C1, M2, Y3, and K4 respectively. Each of the pixels represents a channel in the CMYK colour space. Item 2315 shows the cell corresponding to cell 2305, and the labelling of pixels within the cell. The set of four pixels together form a colour in the CMYK colour space, with the CMYK colour written in the notation (C1,M2, Y3,K4). Next the processor 205 attributes values to each of the pixels in the test pattern containing pixels in the CMYK colour space, with those values being derived from the values of the corresponding set of greyscale pixels. Values for the C1, M2, Y3, and K4 pixels are attributed as follows:

C1 is given a cyan value of 255 if G1 is greater than 127, and given a value of 0, which corresponds to white, if G1 is less than or equal to 127;

M2 is given a magenta value of 255 if G2 is greater than 127, and given a value of 0, which corresponds to white, if G2 is less than or equal to 127;

Y3 is given a yellow value of 255 if G3 is greater than 127, and given a value of 0, which corresponds to white, if G3 is less than or equal to 127; and K4 is given a black value of 255 if G4 is greater than 127, and given a value of 0, which corresponds to white, if G4 is less than or equal to 127.

The CMYK test pattern formed in this manner contains pixels having one of 5 distinct pixel colours, those being white, cyan, magenta, yellow or black.

A second test pattern described here, termed a dyadic test pattern, is useful for measuring the accuracy of the colour measurements of the imaging system under test. The dyadic test pattern contains a number of patches. Each of the patches may have a known constant, flat colour. Alternately, the dyadic test pattern may contain patches of slowly varying colour, patches having a pattern with a specific frequency distribution and/or orientation to measure other aspects of the imaging system's performance, patches having pseudo-random noise, or combinations of the above. It is convenient for such patches to have different sizes within the dyadic test pattern to assist in measuring the imaging system's response to different sized input patches.

Figure 11:
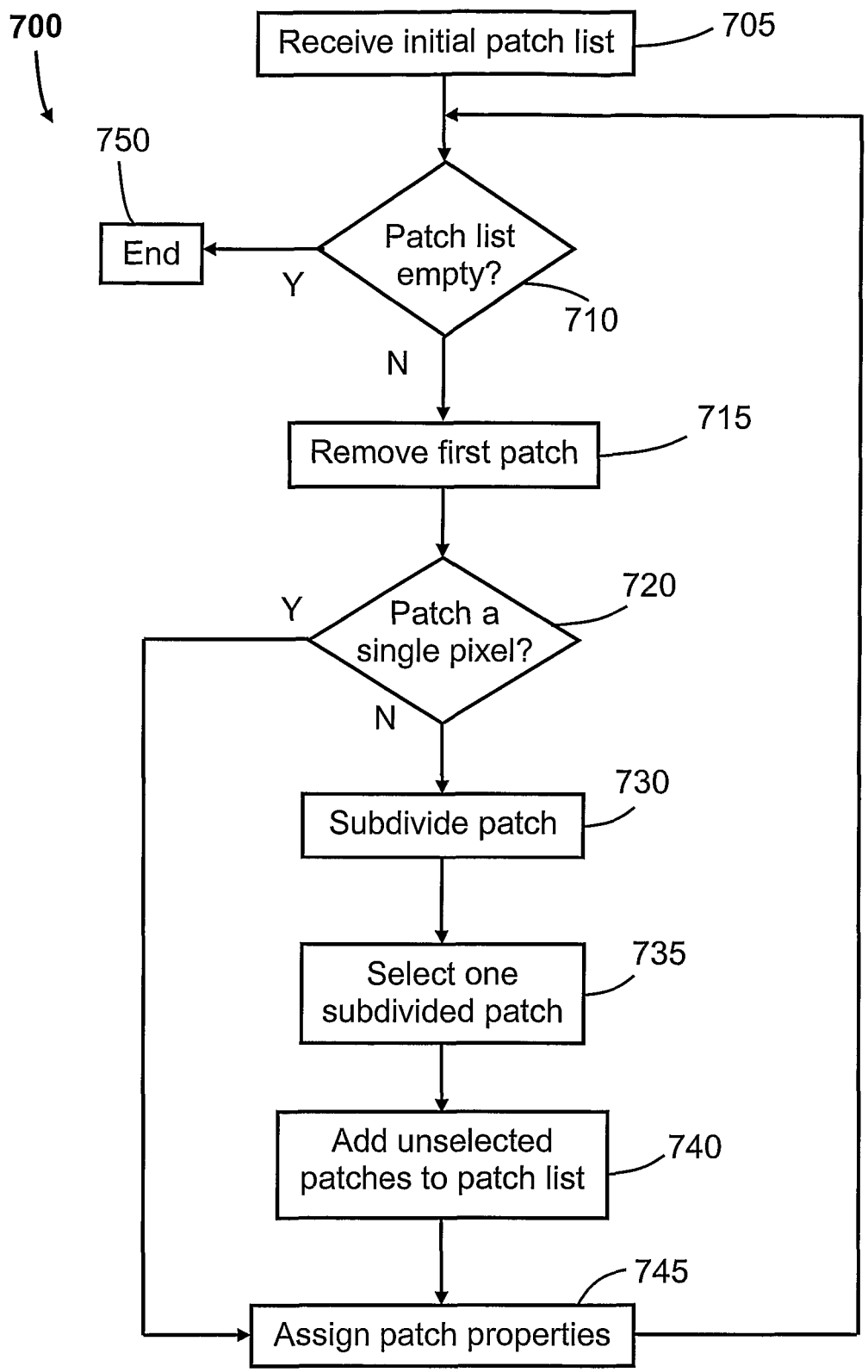
FIG. 11 shows a flow diagram of a method of generating a dyadic test pattern.

FIG. 11 shows a flow diagram of a method 700 of generating a dyadic test pattern. The patches have different sizes and colour properties, with the properties of the patches predetermined dependent on the characteristic of the imaging system that is to be measured.

Method 700 starts in step 705 where the processor 205 receives an initial patch list, and stores the initial patch list in the storage device 209. The initial patch list specifies how many similar regions on the test pattern are to be created. Each similar region in one implementation contains a single flat patch of colour and multiple smaller patches of colour. In another implementation each similar region contains a single patch with slowly varying colour and multiple smaller patches, each also with slowly varying colour. In yet another implementation each similar region contains a single patch with a pattern with a specific frequency distribution and orientation, and multiple smaller patches, each also containing a pattern with a specific frequency distribution and orientation.

The initial patch list may specify that the dyadic test pattern is to be generated containing an 8×8 arrangement of 64 square regions or tiles, each of size 256 pixels by 256 pixels, where each region has a single large patch of colour and progressively more patches of colour at progressively smaller sizes.

In step 710 the processor 205 determines whether the (initial) patch list is empty. If it is determined in step 710 that the patch list is empty, method 700 proceeds to step 750 where method 700 ends.

Alternatively, if the processor 205 determines in step 710 that the patch list is not empty, then the method 700 proceeds to step 715 where the processor removes a first patch from the patch list. Step 720 follows where the processor 205 determines whether the patch removed from the patch list in step 715 has a width or height of only a single pixel.

If it is determined in step 720 that a dimension of the patch under consideration is greater that a single pixel, then that patch is subdivided in step 730. In particular, the patch is subdivided into four smaller patches, with each smaller patch being a square covering a quarter of the area of the patch being divided. In the case where the patch being divided has a width or height that is an odd number, the patch is divided to form smaller patches that are as near as practicable to a quarter of the area of the patch being divided. In step 735 that follows the processor 205 selects one of the smaller patches in such a way so as to avoid any substantial periodicity in the generated test pattern. One method that may be employed by the processor 205 to avoid any substantial periodicity in the generated dyadic test pattern is to select the smaller patch from the four available smaller patches randomly. The unselected patches are added to the patch list in step 740. The (smaller) patch selected in step 735 is not subdivided further, and a property, such a colour, is assigned to that patch in step 745, with the property assigned to the patch being assigned according to the size and location of the patch under consideration within the dyadic test pattern. After step 745 the method 700 returns to step 710.

Also, if it is determined in step 720 that the patch under consideration does have a dimension that is only a single pixel, then that patch is not to be subdivided further, and a property is assigned to that patch in step 745 as is described above.

It can be seen that the effect of method 700 is that, each time steps 710 to 745 are performed, a patch from the patch list is removed, divided into 4 smaller patches, one of the smaller patches is assigned a property while the other 3 patches are added to the patch list. This process continues until the patches can no longer be divided.

An example of a manner in which the property of colour may be assigned to a patch in step 745 in the case of a dyadic test pattern with an 8×8 arrangement of 64 square regions is to assign each of the 64 large patches, resulting from the initial division of the regions, a different shade of grey, and to assign all the other (smaller) patches a random colour.

Other multi-scale test patterns may be generated using a method similar to method 700 by decomposing other shapes, other than squares, into collections of smaller shapes. For example, triangles may be used as the shapes, and selectively divided into smaller triangles through some pseudo random decision process.

Multi-scale test patterns have the advantage that, not only do they provide patches or regions having the required properties, but they also provide for improved alignability due to the induced spatial variation. Closely connected with the improved alignability is an increase in the spatial frequency content of the test pattern.

A third test pattern described here is a test pattern having a frequency response chosen to provide a good degree of contrast for the imaging system under test, while still containing a wide range of frequencies. As is known in the art of image analysis, an image is generally alignable if the image contains a pattern with a wide Fourier spectrum. For this reason pattern having a frequency spectrum that is flat is often chosen.

However, a flat frequency spectrum also has a number of disadvantages in some limited circumstances. One disadvantage results from the fact that a pattern having a flat frequency spectrum, even when printed in binary, has high frequency energy which is higher than that contained in natural patterns. Natural patterns tend to have a frequency spectrum that follows a 1/frequency curve. If the imaging system attenuates high frequencies to any extent, or if the imaging system captures or represents the test pattern at a resolution below that of the digital version of the test pattern, then much of the energy contained in the high frequencies of the test pattern is lost. This may result in an image of the test pattern with very poor contrast, which in turn may interfere with the test of the imaging system. For example, the focus mechanism for the camera 160 may not operate correctly with a test chart 110 containing a spectrally flat test pattern because the focus mechanism cannot detect any strong edges.

An alternative to a test pattern having a flat frequency spectrum is a test pattern having a frequency response chosen to provide a good degree of contrast for the imaging system, while still containing a wide range of frequencies. An example of such a test pattern is a random fractal, which may be generated by a variety of means. One such means is to create random noise with a spectral distribution of the form:

$$f(x, y) = F^{-1}\left(\frac{\text{random}(x, y, s)}{r^{-\beta}}\right) \qquad (9)$$

where the function random is a pseudo-random function operating on a seed s, $F^{-1}$ is the inverse Fourier transform, r is the radial distance from the Fourier origin, and parameter $\beta$ is chosen to have some real value, typically between 1 and 3. In the preferred implementation parameter $\beta=1$, which produces a pattern with fractal dimension 3 and is highly textured.

The use of such a test pattern has the advantage that more energy is available in the lower frequencies, resulting in an image captured of the test pattern, such as when scanner 120 or camera 160 are used, or an image printed of the test pattern, such as when printer 130 is used, to having more contrast. Because the spectral scaling factor, $r^{-\beta}$, is scale-invariant, computation of the MTF is made easier than it would be where some non scale-invariant scaling factor is used.

Generally, to allow accurate alignment, the test pattern should contain areas with a large amount of fine detail. The finer the detail, the more distinct each pixel is when compared with its neighbours. Regardless of any fine detail contained in the areas, if such areas are repetitive or have properties similar to neighbouring areas, then there is a probability that areas may be incorrectly registered with neighbouring areas instead, as such areas may become indistinguishable. It is therefore preferable for areas in the test pattern not to be repetitive.

In view of the foregoing, a fourth test pattern described here is a test pattern wherein the spatial locations of elements within the test pattern are randomly permuted to improve registration. For example, consider a test pattern consisting of differently coloured tiles, with the tiles all having the same size. It may be required that the colours of the tiles cover a predetermined range of hues, saturations and brightness in a regular manner. According to the fourth test pattern, the colour patches formed are randomly permuted so that there is essentially no regularity to the way that the colours of the patches change. Tile boundaries within this fourth test pattern are now between tiles with colours that are substantially different, producing improved structures for facilitating improved image registration.

Figure 12A:
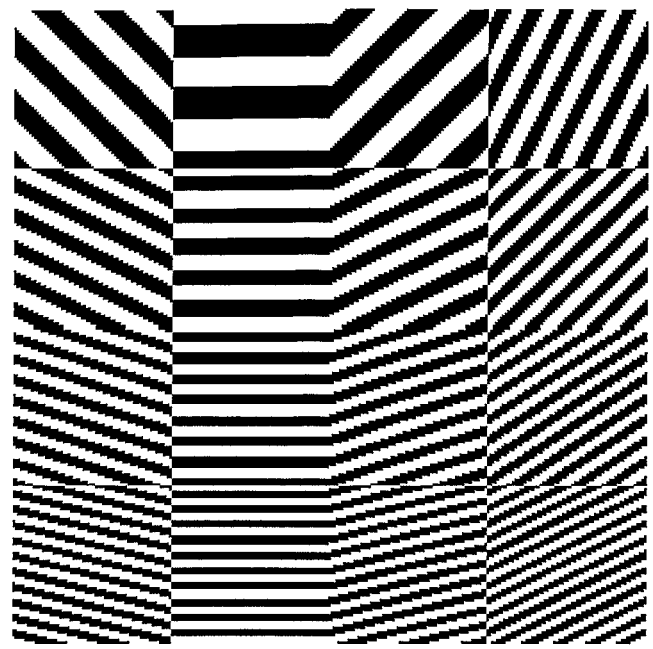
FIG. 12A shows an example test pattern consisting of tiles having frequency responses and orientation covering a predetermined range.
Figure 12B:
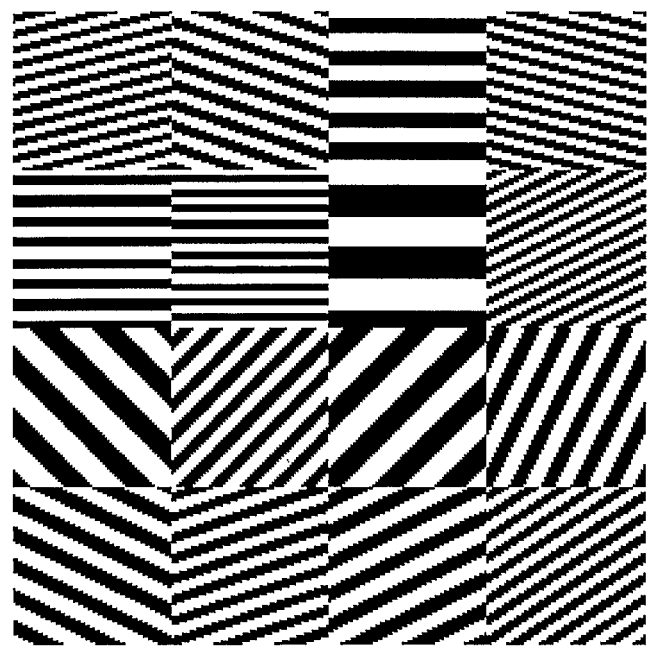
FIG. 12B shows an example test pattern derived from the test pattern shown in FIG. 12A, but with the spatial locations of the tiles randomly permuted.

It is noted that the characteristics of the elements are not limited to colour. For example, consider a test pattern consisting of tiles having frequency responses and orientation covering a predetermined range, such as the test pattern shown in FIG. 12A. As can be seen, neighbouring tiles have very similar frequency responses and orientation, which may adversely effect registration. FIG. 12B shows a test pattern wherein the spatial locations of the tiles from the test pattern shown in FIG. 12A are random permuted to improve registration.

It is often desirable to measure multiple characteristics of an imaging system without the need to produce multiple test patterns, to form test charts from the test patterns where applicable, to capture an image of each of the test patterns, and then to analyse the resulting images. To that end it is often advantageous to combine elements from different types of test patterns onto a single test pattern. It should be apparent that different types of test patterns may be combined onto a single test pattern by placing two or more test patterns on a single test chart, or by combining elements of these test patterns in other ways. A person skilled in the art would understand that some combinations of test patterns are not permissible. For example, flat colour patches of a dyadic test pattern for use in colour measurement can not be combined with other elements without affecting the constant colour. However, such restrictions can be localized to relatively small parts of the test pattern.

It is also often desirable to surround each test chart with a region filled with a colour noise pattern. This allows accurate alignment right to the edge of the test pattern.

Additional information regarding the nature of each pixel, such as a label identifying to which patch in the test pattern the pixel belongs in the case of dyadic test patterns, or the texture, colour or spatial frequency of the region in the test pattern to which the pixel belongs, may be stored as metadata to the file containing the test pattern image when stored on the memory 206. Such information may be used for high level comparison of regions within a test pattern image and an image captured using the imaging system under test containing the test pattern, and may be a label or a high level descriptor.

For high level comparison to work, the correspondence of regions needs to be found with pixel or sub-pixel accuracy. This is requires so that it is clear exactly which pixels form the region denoted by the higher level descriptor or label.

With a number of useful test patterns described above, as well as the manners in which a digital image of the test pattern is formed for each of the arrangements 100, 101 and 102 shown in FIGS. 1 to 3, FIG. 13 shows a schematic flow diagram of a method 1000 of registering two digital images, and then analysing the registered images in order to determine characteristics of the imaging system under test. In particular, the two images registered by method 1000 are a test pattern image 1005, which is a digital representation of one of the test patterns described above (or a combination of the test patterns), and an image 1010 formed by the imaging system under test containing the test pattern and in the manner described with a reference to FIGS. 1 to 4. The dimensions of these images are not necessarily equal.

Method 1000 starts in step 1015 where a coarse registration of images 1005 and 1010 is performed. In the simplest form the coarse registration is achieved by mechanical means prior to capturing image 1010, for example by using a guide template (not illustrated) when placing the test chart 110 onto the scanner 120 (FIG. 1).

Figure 14:
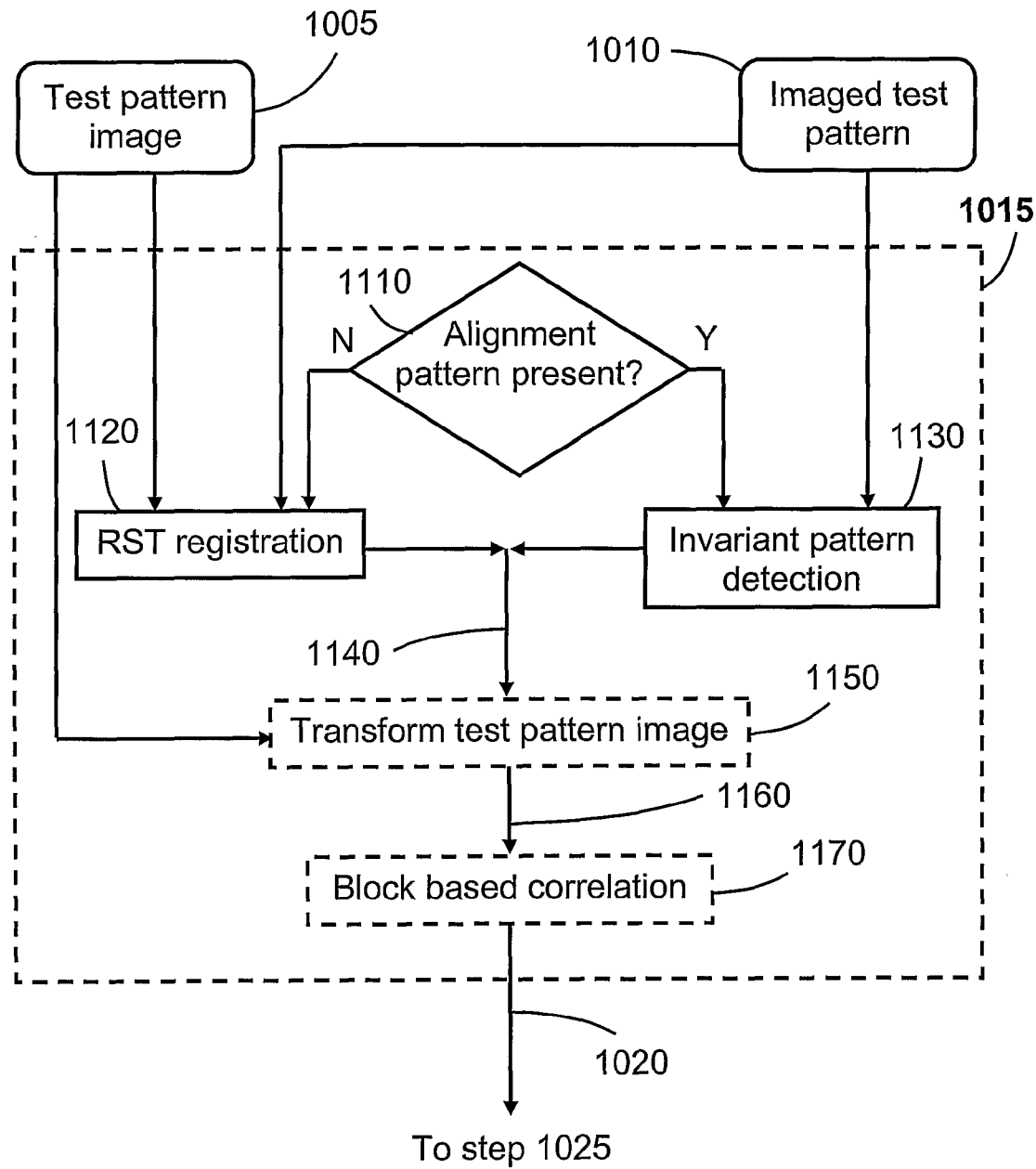
FIG. 14 shows a schematic flow diagram of a preferred implementation of the coarse registration performed in the method of FIG. 13.

In a preferred implementation the coarse registration of step 1015 is performed by the processor 205 and in a manner described in more detail below with reference to FIG. 14. The output of the preferred coarse registration performed in step 1015 is registration parameters 1020, which are a set of linear transformation parameters $(a_{11},a_{12},a_{21},a_{22},x_0,y_0)$. The set of linear transformation parameters $(a_{11},a_{12},a_{21},a_{22},x_0,y_0)$ relates the pixel coordinates (x,y) (in the Cartesian coordinate system) to transformed coordinates $(\tilde{x},\tilde{y})$ through:

$$\begin{pmatrix} \tilde{x} \\ \tilde{y} \end{pmatrix} = \begin{pmatrix} a_{11} & a_{12} \\ a_{21} & a_{22} \end{pmatrix} \begin{pmatrix} x \\ y \end{pmatrix} + \begin{pmatrix} x_0 \\ y_0 \end{pmatrix} \qquad (10)$$

When a transformation defined by the registration parameters 1020 is applied to the test pattern image 1005, then images 1005 and 1010 should be coarsely aligned, generally to within a few pixels.

Accordingly, after step 1015 method 1000 proceeds to step 1025 where the processor 205 uses the set of registration parameters 1020, that is parameters $(a_{11},a_{12},a_{21},a_{22},x_0,y_0)$, to transform the test pattern image 1005 to thereby form a coarsely registered test pattern image 1030 which is coarsely registered with the image 1010 formed by the imaging system under test. In particular, the value at coordinate $(\tilde{x},\tilde{y})$ in the coarsely registered test pattern image 1030 has the luminance value of the pixel at coordinate (x,y) in the test pattern image, where coordinate (x,y) is determined by an inverse of the linear transformation represented by the registration parameters 1020 as follows:

$$\begin{pmatrix} x \\ y \end{pmatrix} = \frac{1}{a_{11}a_{22} - a_{12}a_{21}} \begin{pmatrix} a_{22} & -a_{21} \\ -a_{12} & a_{11} \end{pmatrix} \begin{pmatrix} \tilde{x} - x_0 \\ \tilde{y} - y_0 \end{pmatrix}. \qquad (11)$$

For coordinates (x,y) that do not correspond to pixel positions, bi-cubic interpolation is used to calculate the luminance value for that position from neighbouring values.

Figure 21:
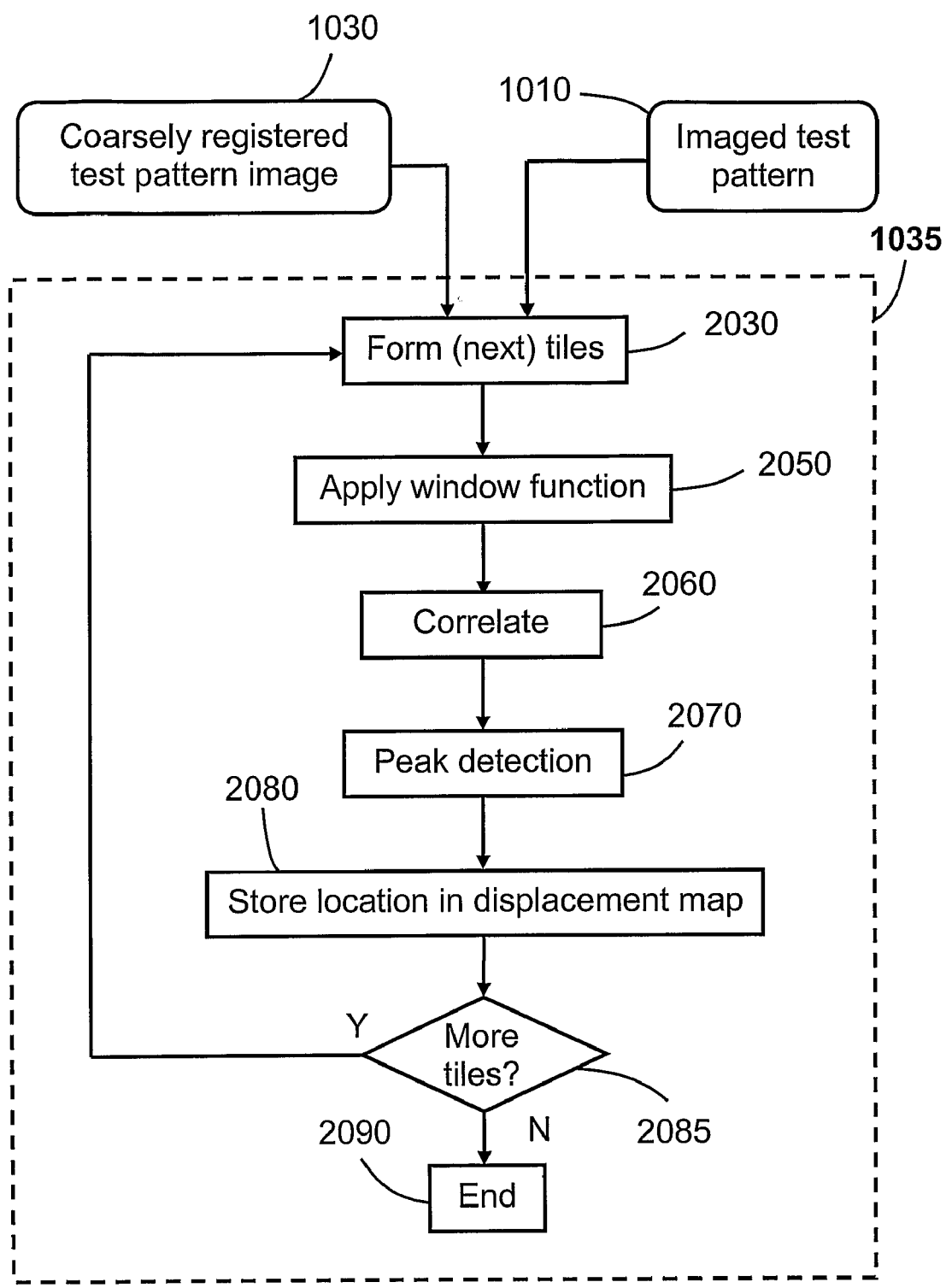
FIG. 21 shows a schematic flow diagram of the steps for performing block based correlation.

Images 1010 and 1030 are then input into step 1035 where the processor 205 performs block-based correlation and in a manner described in more detail below with reference to FIG. 21. The block-based correlation of step 1035 divides the images 1030 and 1010 into smaller, possibly overlapping blocks, and generates a displacement map 1037 that represents the displacement that is required to be performed on each block of the coarsely registered test pattern image 1030 in order to map the pixels of the blocks of the coarsely registered test pattern image 1030 with that of the image 1010. The displacement map 1037 formed by the block-based correlation of step 1035 is then interpolated in step 1040, using bi-cubic interpolation, to form a distortion map 1045. The distortion map 1045 represents the distortion to sub-pixel accuracy that maps each pixel of the coarsely registered test pattern image 1030 to the corresponding pixel in the image 1010 formed by the imaging device under test.

The distortion map 1045 together with the registration parameters 1020 resulting from the coarse registration performed in step 1015 are then used by the processor 205 in step 1050 to warp the test pattern image 1005 to form a registered test pattern image 1055. The warping performed in step 1050 starts by modifying the distortion map 1045, which represents the distortion that maps the pixels of the coarsely registered test pattern image 1030 to pixels of image 1010, to a distortion that maps the pixels of the test pattern image 1005 to pixels of image 1010. This is done by adding the linear transformation determined in the coarse registration step 1015 to the distortion map 1045 as follows:

$$D''(i,j) = D'(i,j) + \begin{pmatrix} a_{11} & a_{21} \\ a_{12} & a_{22} \end{pmatrix} \begin{pmatrix} x_{ij} \\ y_{ij} \end{pmatrix} + \begin{pmatrix} x_0 \\ y_0 \end{pmatrix}. \quad (12)$$

wherein D'(i,j) represents the distortion map 1045 and D"(i,j) represents the total warping performed in step 1050.

Next a new image having the same size as that of image 1010 is formed, with all pixel values set to null. This new image, when populated with pixel values, will be the registered test pattern image 1055. For each pixel in the new image a pixel value is calculated by first determining the warping applicable to that pixel position. The processor 205 then calculates the pixel value by determining the pixel value in image 1005 that corresponds with that warped position. As it is likely that the warped position will not correspond with a pixel position in image 1005, interpolation is used for calculating the pixel value, which is then stored in memory 206.

The registered test pattern image 1055 typically includes several pixel components, for example red, green, and blue intensity components, as well as a label or higher level descriptor. Accordingly, all pixel components including the label or higher level descriptor are warped in step 1050 to form the registered test pattern image 1055. By warping the label a direct comparison of image regions can be made by mapping the labels of the registered test pattern image 1055 onto the imaged test pattern 1010.

When performing the interpolation to calculate the pixel values of the registered test pattern image 1055, different interpolation methods may be used to interpolate each pixel component. For example, the red, green and blue components may be calculated using bi-cubic interpolation, whereas the integer label may be calculated using nearest-neighbour interpolation. The label channel, which is typically formed by integers, is interpolated using nearest neighbour interpolation to ensure only integers result in the output. Other interpolations techniques would tend to average adjacent labels resulting in non-integer labels, or labels with integers that did not occur previously. The nearest neighbour interpolation of the labels results in a warped label map with labels accurate to the nearest half pixel.

Figure 26:
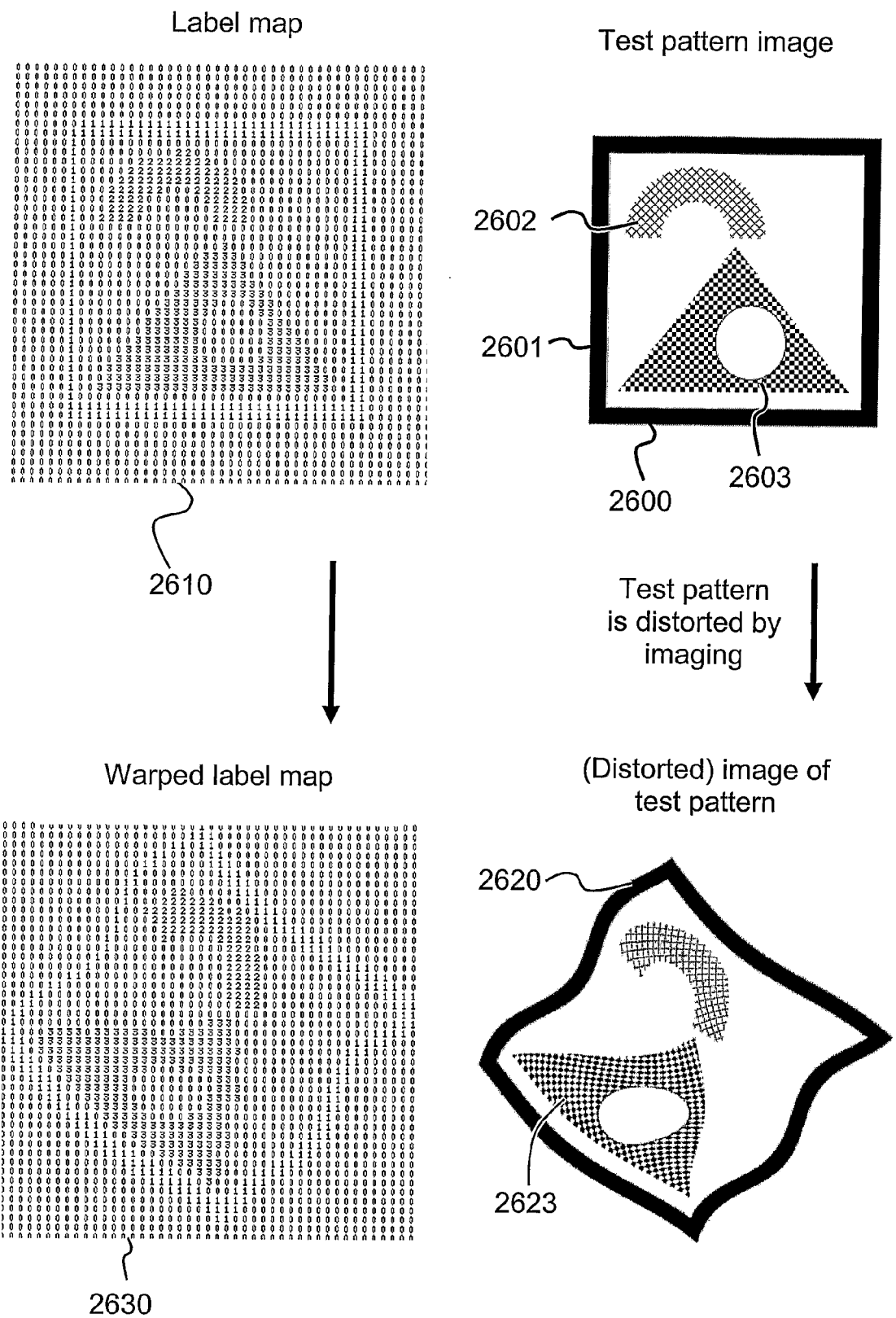
FIG. 26 illustrates the warping of pixel labels.

FIG. 26 illustrates the warping of pixel labels. A test pattern image 2600 is illustrated having 3 coloured/textured regions 2601, 2602 and 2403 on a white background. A label map 2610 of test pattern image 2600 is also illustrated, with the labels of the pixels in the label map 2610 indicating the region 2601, 2602 or 2403 to which the pixel belongs. In particular, the labels of the pixels in the pixel map 2610 have integer values "0", "1", "2" or "3" dependent on whether the pixel is part of the white background, or regions 2601, 2602 or 2603.

An image 2620 captured of the test pattern image 2600 is further illustrated. As can be seen, the image 2620 is a greatly distorted version of the test pattern image 2600. During step 1050 described above where a registered test pattern image (not illustrated) is formed by warping the test pattern image 2600, a warped label map 2620 is formed. The labels of the pixels in the warped label map 2630 indicate the region 2601, 2602 or 2403 to which the pixel belongs.

The warped label map 2630 may be directly superimposed onto image 2620, and used as a label layer of image 2620. The process may also be viewed as the reintroduction of image metadata (on a pixel-by-pixel basis) after an imaging process (such as printing-scanning) that lost the metadata linkage.

Once the label layer is inserted into the image 2620, all manner of higher level descriptors can be defined and calculated. For example, it might be that a label "3" denotes regions 2603 with certain textural properties, as is illustrated in FIG. 26. By computing the ensemble pixel value statistics of all pixels labelled "3" within image 2620, the global textural properties of region 2623 are known.

The registered test pattern image 1055 is precisely aligned to the image 1010 formed by imaging system under test. The final step of method 1000 is step 1060 where the processor 205 uses one or more of the images 1010 and 1055, the distortion map 1045, and the registration parameters 1020 to analyse the registered images 1010 and 1055 in order to determine characteristic of the imaging system under test.

For example, the distortion map 1045 represents the "fine" part of the mapping of pixels in the imaged test pattern 1010 to pixels in the test pattern image 1005. Accordingly, in the case of scanner 120 (FIG. 1), the distortion map 1045 represents inaccuracies in the scanning process, such as those that may be caused by non-constant drive speed, an aspect ratio error, or some other physical errors in the scanner's scanning mechanism. The distortion map 1045 also represents the distortions introduced by the lens of camera 160, and inaccuracies in the drive mechanism of the printer 130.

Another form of the analysis of the quality of an imaging device is the measurement of the modulation transform function (MTF) of that device. The MTF may be measured using any test pattern with a suitable spread-spectrum. Examples of appropriate patterns include a two-dimensional M-sequence, greyscale pseudo-random noise, binarized pseudo-random noise, and two-dimensional perfect binary arrays (which have perfect autocorrelations for certain array sizes; perfect being defined as an autocorrelation with no sidelobes). Any pattern having sufficient detail may be used for accurate alignment and may be incorporated in the test pattern.

The MTF is calculated by the processor 205 by dividing each pixel of the modulus of the Fourier transform of the imaged test pattern 1010 by each pixel of the modulus of the Fourier transform of the registered test pattern image 1055, thereby producing an image of the two-dimensional MTF of the scanner 120. It is possible to localize and repeat the MTF measurement at various locations around the image area, so that spatial variations of the MTF may be detected.

With accurate alignment it is also possible to estimate the full (complex) optical transfer function (OTF), not just its modulus, which is the MTF. The full OTF is calculated by the processor 205 by taking the Fourier transform of the system point spread function (PSF). The advantage of calculating the OTF is that the system PSF may be calculated directly, whereas the more common MTF measurement does not allow PSF estimation. The various transfer functions are only applicable to linear systems, which in practice means that these calculations need to be carried out in the correct colour space, with particular care being taken to use the correct contrast model or gamma. The reason alignment is important when performing the OTF measurement is that any distortions in the imaged test pattern 1010 will result in phase errors in the Fourier Transform of the imaged test pattern 1010, which in turn will affect the OTF measurement.

Yet further, analysis and calibration of the colour response of the scanner 120 may be implemented using a colour test pattern containing a distribution of suitably sized colour patches, such as the dyadic test pattern described above. Typically the colour calibrated test chart 110, which is scanned by the scanner 120 under test, is fabricated on a printing device, with the colour patches calibrated with respect to a known colour standard using a device such as a scanning spectrophometer. Because the pixels in the registered test pattern image 1055 are aligned with those in the imaged test pattern 1010 in the manner described above, the processor 205 has knowledge to which patch each pixel belongs. The processor 205 then combines the colour of the pixels of different patches of the imaged test pattern 1010 by averaging in a suitable colour space, and then compares the average colour of each patch with the known spectrophometer value. A colour profile may then be generated using maximum likelihood or least-squares methods.

Another form of analysis is termed granularity, and is determined when the imaging system under test is the printer 130 (FIG. 2). Granularity attempts to measure how smooth a patch of solid colour printed on the printer 130 appears to a human viewing the patch at a nominal viewing distance. For this analysis, test chart 150 contains the dyadic test pattern. The granularity of a patch is calculated by the processor 205 from the standard deviation of the luminance values of the patch after it has been filtered by a visual transfer function (VTF) that roughly mimics the effect of the human visual system when viewing a piece of paper at a distance of 30 cm. The VTF used is described in frequency space by:

$$V(f_x, f_x) = \begin{cases} 5.05(e^{-0.138*5f})(1-e^{-0.1*5f}): & f \geq 1 \\ 1: & f < 1 \end{cases} \quad (13)$$

where $f^2 = f_x^2 + f_y^2$ and $f$ is measured in cycles/mm on the scanned page.

The filtering is performed by selecting a region of the image, R, twice the size of the patch and extending around the patch for which the granularity is to be measured. The luminance of this region R is then filtered using:

$$R' = \mathfrak{F}^{-1}(\mathfrak{F}(R) \cdot V(f_x, f_y)), \quad (14)$$

where $\mathfrak{F}$ and $\mathfrak{F}^{-1}$ are the two-dimensional FFT and inverse FFT respectively.

The granularity is then measured by the processor 205 by taking a square region of n by n pixels within the patch that covers a significant fraction of the original patch but avoids its borders, and measuring the mean and standard deviation of the luminance values within this square region of n by n pixels through:

$$\overline{R} = \frac{1}{n^2} \sum_{i,j=1}^{n} R'_{i,j} \quad (15)$$

and $$G = \left\{ \frac{1}{n^2 - 1} \sum_{i,j=1}^{n} (R'_{i,j} - \overline{R})^2 \right\}^{1/2} \quad (16)$$

where G is the granularity of the patch, $R'_{i,j}$ is the luminance value of a pixel in the region, and $\overline{R}$ is the mean of the luminance values of the pixels in the region. The final measure G corresponds to how grainy a nominally flat colour appears to a human observer at a specific (viewing) distance from the printed test chart 150. The granularity may also be thought of as a measure of the deviation of a colour patch from its mean level.

When evaluating a colour printer, such as a CMYK printer, it is desirable to also measure the alignment of different colour channels. For example, the C channel of an image printed in the CMYK colour space may be several pixels offset from other channels due to some mechanical inaccuracy in the printer 130. This mis-registration leads to noticeable visual defects in the printer's output, namely visible lines of white between objects of different colour that should not be present. Detecting and preventing such errors is an important problem to be solved in the design and manufacture of colour printers.

For this analysis the colour test pattern consisting of the alignment pattern superimposed with the pseudo-random noise pattern is used. Also, during performance of the block based correlation in step 1035 (FIG. 13), correlation is performed between the K channel of the coarsely registered test pattern image 1030 and the K component of the imaged test pattern 1010, with the K component of the imaged test pattern 1010 calculated from the RGB values as K=Min(255−R, 255−G, 255−B). This produces a registered test pattern image 1055 in which the black pixels thereof are aligned precisely with the black pixels of the imaged test pattern 1010. Due to the possibility that the colour channels are mis-registered in the printing process, the C, M and Y channels of the registered test pattern image 1055 may not be precisely aligned with the imaged test pattern 1010.

The block based correlation of step 1035 is then performed between each of the C, M and Y channels of the registered test pattern image 1055 and those of the imaged test pattern 1010 in order to produce a distortion map for the C, M and Y channels, each of which being similar in form to the K channel distortion map 1045. Each of the C, M and Y channel distortion maps shows how the mis-registration of the corresponding colour channels with respect of the K channel varies across the printed page. These distortion maps, or information derived therefrom, may be supplied to a field engineer to allow physical correction of the mis-registration problems, or alternately, they may be input to the printer 130 for use in a correction circuit that digitally corrects for the printer colour channel mis-registration. Printer colour channel mis-registration is typically caused by the paper rollers thereof not being exactly centred circular cylinders.

When measuring the performance of the optical imaging system of camera 160 FIG. 3, it is often useful to know the level of distortion present in a camera image. Typically the distortion may be pincushion or barrel distortion. The distortion typically depends on the lens used by the camera 160. In the case of a zoom lens the distortion will vary with the focal length selected. The distortion map 1045 shows the residual distortions that remain after perspective distortions have been removed. The residual distortion is further decomposed into radial components (purely related to the distance from the centre of the image) and other components. The other components are typically expected to be negligible in a camera with a symmetrical lens, although precision registration allows the measurement of any deviation from the ideal. The common lens distortions are related to the cube power of the radial distance from the image centre. If the outward radial distortion increases with the distance from the image centre the distortion is called pincushion distortion, if the inward distortion increases with distance then it is called barrel distortion. Calculating a third order least-squares fit to the residual distortion map 1045 determines precisely the pincushion or barrel distortion.

As noted above, in arrangement 102 it is possible to use an LCD instead of a more conventional reflective or transmissive test chart. The chromatic aberration of the optical imaging system of the camera 160 is estimated by the processor 205 by comparing separate distortion maps for each of the R, G and B channels in the RGB colour space.

Care needs to be taken to avoid artefacts of the test chart interfering in the measurement. A test chart based upon an LCD structure inherently has an RGB channel displacement due to the displaced R, G, and B picture elements of the display. This displacement is known and fixed, and so can be eliminated from the final chromatic aberration estimate. The difference in the R, G, and B distortion maps minus the LCD structural RGB channel displacement directly represents the total camera chromatic aberration. The chromatic aberration may be further analysed to separate the optical chromatic aberration (from the lens) and any chromatic effects related to the Bayer colour filtering on the image sensor.

The chromatic effects described above are usually referred to as lateral chromatic aberration. Another type known as axial chromatic aberration does not produce the distortion effects above, but instead introduces a change in the power spectral function shape, and in particular power spectral function width, related to the wavelength of light. Axial chromatic aberration estimation is facilitated by repeating the aforementioned spatially varying power spectral function measurements, but for three separated channels, R, G, and B. The difference in the power spectral function widths of the separate channels characterises the axial chromatic aberration.

The block based correlation performed by the processor 205 in step 1035 is now described in more detail with reference to FIG. 21 in which a schematic flow diagram of the steps for performing the block based correlation is shown. Step 1035 operates on two images, those being the imaged test pattern 1010 and the coarsely registered test pattern image 1030 resulting from step 1025. The size of images 1010 and 1030 are N2 by M2 pixels and N1 by M1 pixels respectively. The coarsely registered test pattern image 1030 is padded appropriately to be the same size as the imaged test pattern 1010.

Figure 22:
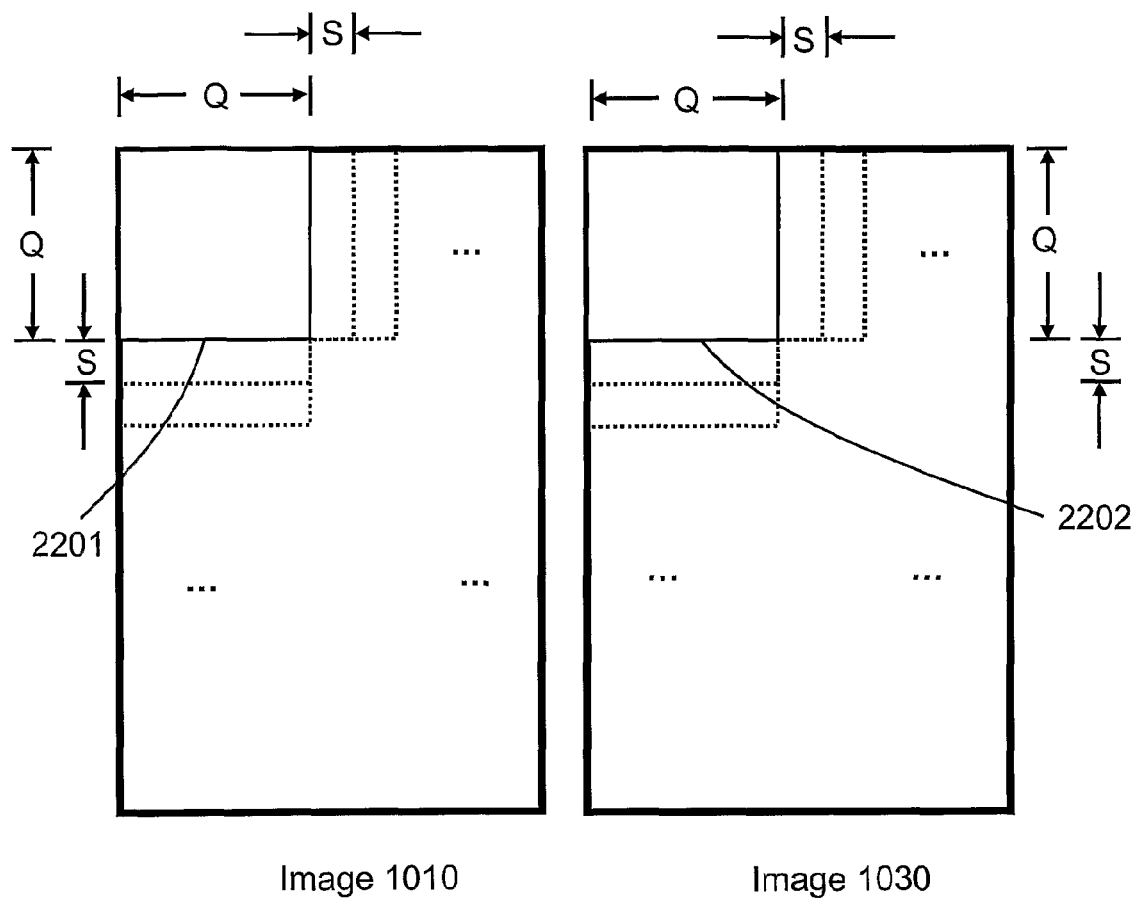
FIG. 22 illustrates two images and the positions of first tiles within those images when performing block based correlation.

During block based correlation, each of the two images are divided in to smaller tiles of dimension Q by Q pixels, with the positions of the tiles corresponding. FIG. 22 illustrates images 1010 and 1030 and the positions of their first tiles 2201 and 2202. Correlation is then performed on the tiles 2201 and 2202 to determine the translation that best relates the two tiles. A next pair of tiles is then formed from images 1010 and 1030 by "stepping" through the images 1010 and 1030 by a step size S. Correlation is then repeated between the newly formed tiles. These steps are repeated until all tiles formed from images 1010 and 1030 by stepping have been processed. In the preferred implementation the parameters are Q=256 and S=32.

The output of the block based correlation step is displacement map 1037 that represents the warp that is required to map the pixels of the coarsely registered test pattern 1030 to the imaged test pattern 1010, as well as a confidence measure for each displacement. The displacement map is a raster image of dimension $D_x = \lfloor (N1+Q-1)/S \rfloor$ by $D_y = \lfloor (M1+Q-1)/S \rfloor$, of displacement vectors and confidence estimates.

Referring again to FIG. 21, step 1035 starts in sub-step 2030 where corresponding tiles are formed from images 1010 and 1030. The tiles have to contain pixel values from images 1010 and 1030 only, hence lie within those images 1010 and 1030. For pixel (i,j) in the displacement map 1037, the tile from image 1030, and the tile from image 1010 have the following coordinates identifying their respective positions in images 1030 and 1010:

$$\text{tile 1: } (\lfloor N1/2 \rfloor + (i - \lfloor D_x/2 \rfloor)S - \lfloor Q/2 \rfloor, \lfloor M1/2 \rfloor + (j - \lfloor D_y/2 \rfloor) S - \lfloor Q/2 \rfloor); \text{ and} \quad (17)$$

$$\text{tile 2: } (\lfloor N2/2 \rfloor + (i - \lfloor D_x/2 \rfloor)S - \lfloor Q/2 \rfloor, \lfloor M2/2 \rfloor + (j - \lfloor D_y/2 \rfloor) S - \lfloor Q/2 \rfloor). \quad (18)$$

Processor 205 next in sub-step 2050 applies a window function, such as a Hanning window, to each of the tiles, and the two windowed tiles are then phase correlated in sub-step 2060.

The result of the phase correlation in sub-step 2060 is a raster array of real values. In sub-step 2070 the processor 205 then determines the location of a highest peak within the raster array, with the location being relative to the centre of the tile. The location of the peak is then stored by the processor 205 in sub-step 2080 into memory 206 in the displacement map 1037 at position (i,j), along with the square root of the height of the peak as a confidence estimate. If it is determined in sub-step 2085 that more tiles exist, then step 1035 returns to sub-step 2030 where a next pair of tiles is formed. Alternatively step 1035 ends in sub-step 2090.

Figure 24:
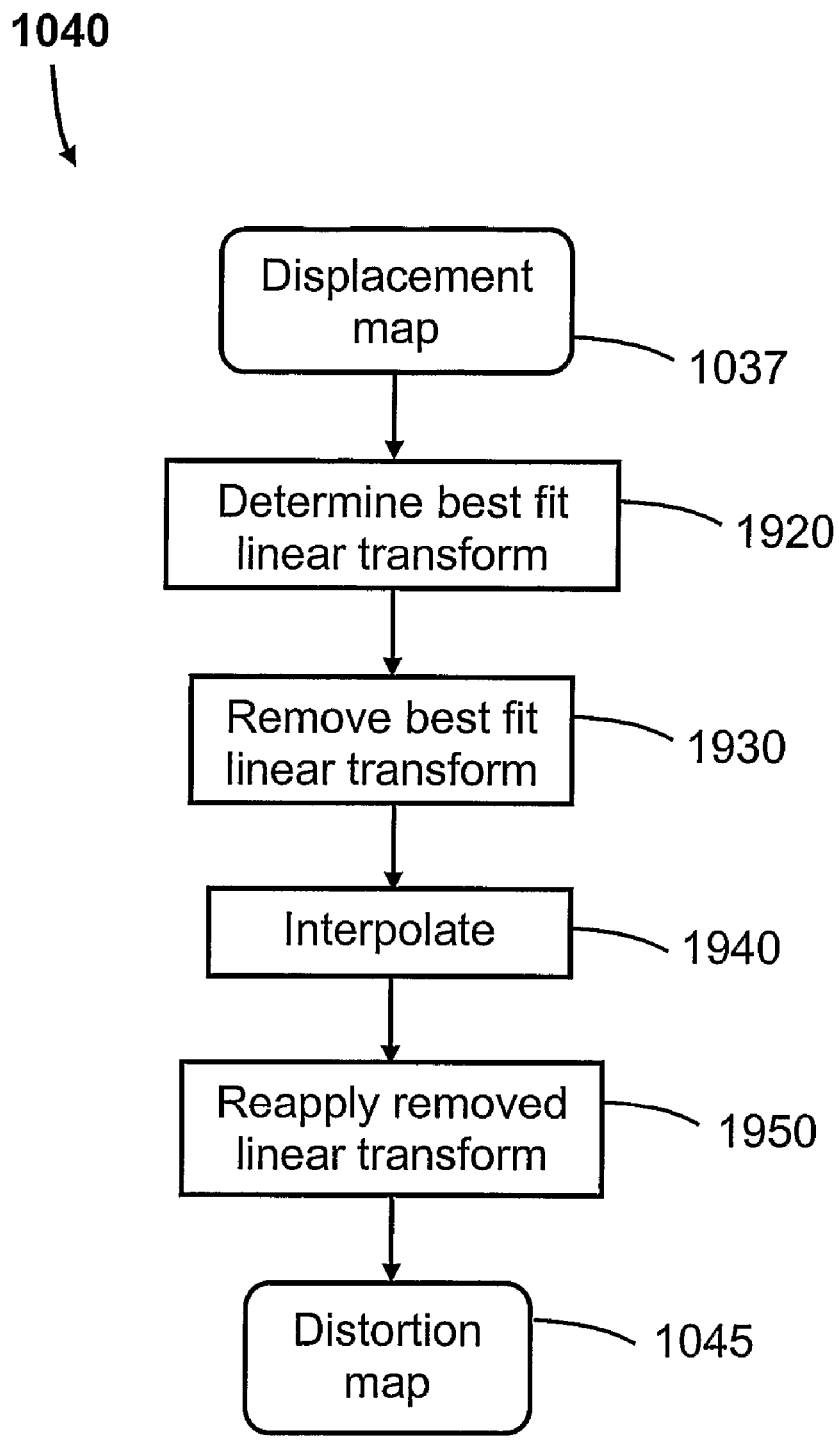
FIG. 24 shows a schematic flow diagram of the steps for performing interpolation.

The interpolation performed in step 1040 (FIG. 13) is now described in more detail with reference to FIG. 24 in which a schematic flow diagram of the steps for performing the interpolation is shown. The interpolation of step 1040 forms the distortion map 1045 from the displacement map 1037. Some values in the distortion map 1045 may map pixels in the coarsely registered test pattern image 1030 to pixels outside the boundary of the imaged test pattern 1010. This is because the imaging device may not have imaged the entire test pattern.

Step 1040 starts in sub-step 1920 where the processor 205 determines the set of linear transform parameters, $(b_{11}, b_{12}, b_{21}, b_{22}, \Delta x, \Delta y)$, that best relates the displacement map 1037.

The (undistorted) points in the imaged test pattern 1010 are labelled $(x_{ij}, y_{ij})$ for pixel (i,j) in the displacement map 1037, and are given by:

$$(x_{ij}, y_{ij}) = (\lfloor N2/2 \rfloor + (i - \lfloor D_x/2 \rfloor)S, \lfloor M2/2 \rfloor + (j - \lfloor D_y/2 \rfloor)S). \quad (19)$$

These points $(x_{ij}, y_{ij})$ are displaced by the displacement map 1037 to give the displaced coordinates, $(\hat{x}_{ij}, \hat{y}_{ij})$, given by $$(\hat{x}_{ij}, \hat{y}_{ij}) = (x_{ij}, y_{ij}) + D(i,j), \quad (20)$$

where D(i,j) is the displacement vector part of the displacement map 1037.

The linear transformation parameters, acting on the undistorted points give affine transformed points, $(\tilde{x}_{ij}, \tilde{y}_{ij})$, given by $$\begin{pmatrix} \tilde{x}_{ij} \\ \tilde{y}_{ij} \end{pmatrix} = \begin{pmatrix} b_{11} & b_{21} \\ b_{12} & b_{22} \end{pmatrix} \begin{pmatrix} x_{ij} \\ y_{ij} \end{pmatrix} + \begin{pmatrix} \Delta x \\ \Delta y \end{pmatrix}. \quad (21)$$

The best fitting affine transformation is determined by minimising the error between the displaced coordinates, $(\hat{x}_{ij}, \hat{y}_{ij})$, and the affine transformed points $(\tilde{x}_{ij}, \tilde{y}_{ij})$ by changing the affine transform parameters $(b_{11}, b_{12}, b_{21}, b_{22}, \Delta x, \Delta y)$. The error functional to be minimised is the Euclidean norm measure E:

$$E = \sum_{n=1}^{N} (\hat{x}_n - \tilde{x}_n)^2 + (\hat{y}_n - \tilde{y}_n)^2 \qquad (22)$$

The minimising solution is $$\begin{pmatrix} b_{11} \\ b_{12} \\ \Delta x \end{pmatrix} = M^{-1} \begin{pmatrix} \sum \hat{x}_n x_n \\ \sum \hat{x}_n y_n \\ \sum \hat{x}_n \end{pmatrix} \qquad (23)$$

$$\begin{pmatrix} b_{21} \\ b_{22} \\ \Delta y \end{pmatrix} = M^{-1} \begin{pmatrix} \sum \hat{y}_n x_n \\ \sum \hat{y}_n y_n \\ \sum \hat{y}_n \end{pmatrix} \qquad (24)$$

with $$M = \begin{pmatrix} S_{xx} & S_{xy} & S_x \\ S_{xy} & S_{yy} & S_y \\ S_x & S_y & S \end{pmatrix} = \begin{pmatrix} \sum x_n x_n & \sum x_n y_n & \sum x_n \\ \sum y_n x_n & \sum y_n y_n & \sum y_n \\ \sum x_n & \sum y_n & \sum 1 \end{pmatrix} \qquad (25)$$

$$M^{-1} = \qquad (26)$$
$$\frac{1}{|M|} \begin{pmatrix} -S_y S_y + S S_{yy} & -S S_{xy} + S_x S_y & S_{xy} S_y - S_x S_{yy} \\ -S S_{xy} + S_x S_y & -S_x S_x + S S_{xx} & S_x S_{xy} - S_{xx} S_y \\ S_{xy} S_y - S_x S_{yy} & S_x S_{xy} - S_{xx} S_y & -S_{xy} S_{xy} + S_{xx} S_{yy} \end{pmatrix}$$

and $$|M| = \qquad (27)$$
$$\det M = -S S_{xy} S_{xy} + 2 S_x S_{xy} S_y - S_{xx} S_y S_y - S_x S_x S_{yy} + S S_{xx} S_{yy}$$

where the sums are carried out over all displacement pixels with non-zero confidence estimates on the displacement vectors in the displacement map 1037.

The interpolation step 1040 continues to sub-step 1930 where the best fitting linear transformation is removed from the displacement map 1037. Each displacement map pixel is replaced according to:

$$D(i, j) \rightarrow D(i, j) - \begin{pmatrix} b_{11} & b_{21} \\ b_{12} & b_{22} \end{pmatrix} \begin{pmatrix} x_{ij} \\ y_{ij} \end{pmatrix} - \begin{pmatrix} \Delta x \\ \Delta y \end{pmatrix}. \qquad (28)$$

The displacement map 1037 with the best fitting linear transform removed is then interpolated using bi-cubic interpolation in sub-step 1940 to a displacement map of dimension $D_x P$ by $D_y P$.

A complication in the interpolation step 1940 is what to do if the displacement map has a pixel with zero confidence in the neighbourhood of the bi-cubic interpolation kernel. If this occurs, the pixel with zero confidence is itself substituted by an estimated value using an average of neighbouring pixels weighted by their confidence value. If no neighbouring pixels have positive confidence, a region-growing algorithm is used to determine the pixel value. The interpolated displacement pixel may now be computed using bicubic interpolation using the pixels with positive confidence along with the substituted pixels in the displacement map. Finally, in step 1950, the interpolated displacement map has the removed best fit linear distortion reapplied according to:

$$D'(i, j) \rightarrow D'(i, j) + \begin{pmatrix} b_{11} & b_{21} \\ b_{12} & b_{22} \end{pmatrix} \begin{pmatrix} x_{ij} \\ y_{ij} \end{pmatrix} + \begin{pmatrix} \Delta x \\ \Delta y \end{pmatrix} \qquad (29)$$

where in this case $$(x_{ij}, y_{ij}) = (\lfloor N2/2 \rfloor + (i/S - \lfloor D_x/2 \rfloor)S, \lfloor M2/2 \rfloor + (j + S - \lfloor D_y/2 \rfloor)S). \qquad (30)$$

The map D'(i,j) forms the output of the interpolation step 1040, which is the distortion map 1045.

Referring again to FIG. 13, the preferred coarse registration performed in step 1015 is now described in more detail with reference to FIG. 14. As was described above, numerous different test patterns may be used. In sub-step 1110, the processor 205 determines whether the test pattern includes an alignment pattern, that is whether the test pattern includes the first test pattern described with reference to FIGS. 5 to 9. In the simplest implementation this may be determined from an input received from an operator of the computer 200. The input also includes the parameters of the test pattern. In an alternative implementation a search for an alignment pattern may be performed by the processor 205 on the test pattern image.

If it is determined that the test pattern does not include an alignment pattern, then step 1015 continues to sub-step 1120 where rotation, scale and translation (RST) registration is performed on the luminance channels of the images 1005 and 1010 respectively. In the alternative, if it is determined in sub-step 1110 that the test pattern does include an alignment pattern, then step 1015 continues to sub-step 1130 where invariant pattern detection is performed. Sub-step 1130 is also performed on the luminance channels of the images 1005 and 1010 respectively. Each of the RST registration performed in sub-step 1120 and the invariant pattern detection performed in sub-step 1130 is described in more detail below. The output of each of the RST registration in sub-step 1120 and the invariant pattern detection in sub-step 1130 is registration parameters.

When registering an imaged test pattern image 1010 formed using arrangement 102 which includes camera 160 and shown in FIG. 3, perspective distortion has to be estimated and compensated for. Accordingly, for arrangements including camera 160 sub-steps 1140 to 1170 described below are performed in order to estimate registration parameters 1020 whereas, for the arrangements not including a camera, such as arrangements 100 (FIG. 1) and 101 (FIG. 2), the output of either of sub-steps 1120 or 1130 is the registration parameters 1020.

Figure 13:
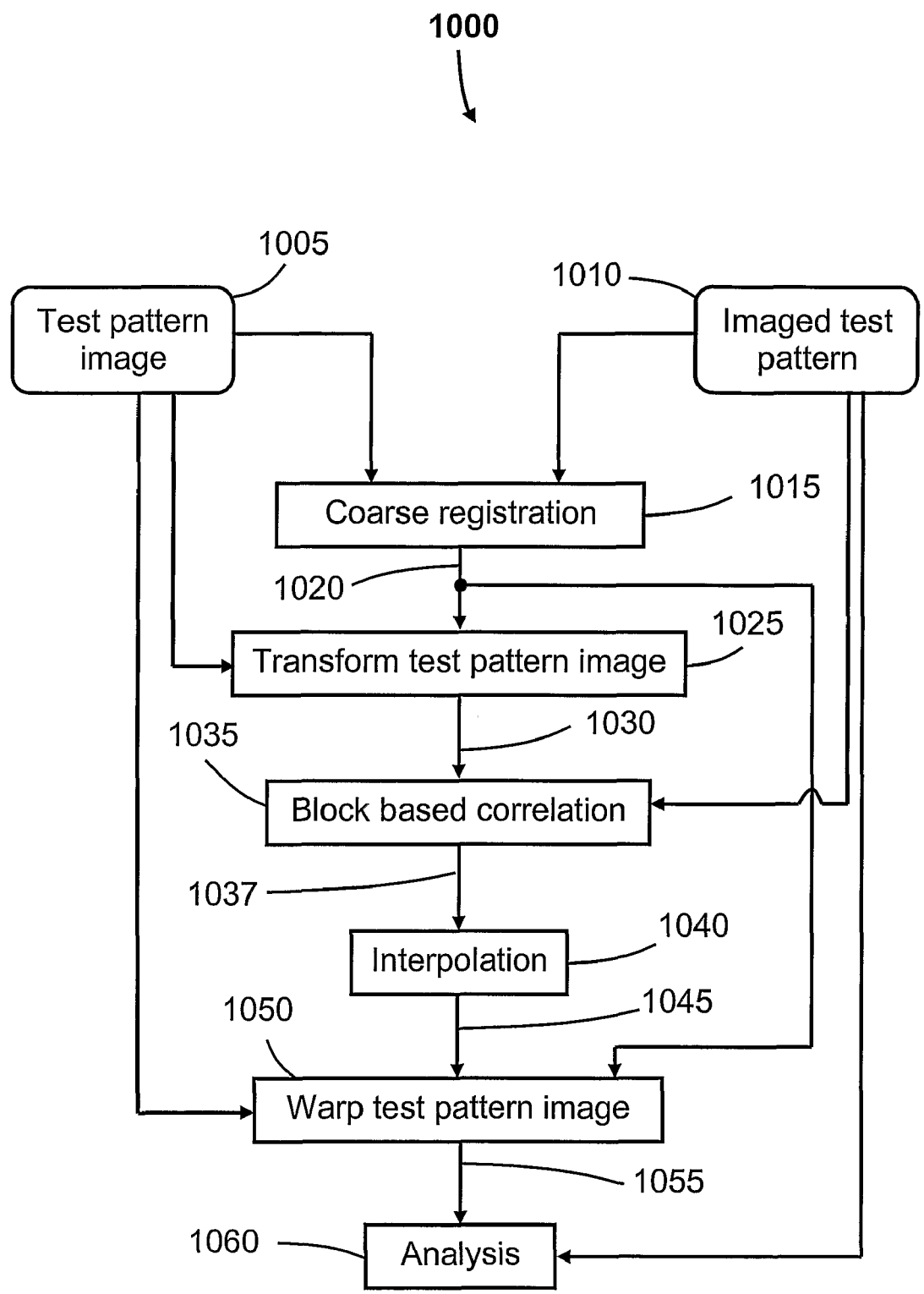
FIG. 13 shows a schematic flow diagram of a method of registering two digital images, and then analysing the registered images in order to determine characteristics of an imaging system under test.

Accordingly, for arrangements including camera 160 the output of either of sub-steps 1120 or 1130 is initial registration parameters 1140. In sub-step 1150 the initial registration parameters 1140 are used to transform the test pattern image 1005 in a manner similar to step 1025 (FIG. 13) to thereby form an initially registered test pattern image 1160 which is coarsely registered with the image 1010 formed by the camera 160. The processor 205 then performs a block based correlation between the initial registered test pattern image 1160 and the imaged test pattern 1010 in a manner similar to that described for step 1035 (FIG. 13). The output of the block based correlation step 1170 is a displacement map, which is a $N_x$ by $N_y$ image with three components, where the first two components of the pixel at location (j,k) represent the displacement $(\Delta_{jk}^{(x)}, \Delta_{jk}^{(y)})$ of the pixel at $(x_{jk},y_{jk})$ in the test pattern image 1005, to its position in the imaged test pattern 1010, and the third component represents a confidence estimate $F_{jk}$ for which a non-zero value indicates that the block correlation step 1170 was successful in determining a displacement for the block centred on that pixel. This displacement map may be used with a standard least squares minimisation algorithm such as the Levenberg-Marquardt algorithm to find the values of the perspective transformation parameters, $(b_{11}, b_{12}, b_{13}, b_{21}, b_{22}, b_{23}, b_{31}, b_{32})$, that minimise the following error functional $$E = \sum_{j,k|F_{jk}\neq 0} (\tilde{x}_{jk} - x_{jk} - \Delta_{jk}^{(x)})^2 + (\tilde{y}_{jk} - y_{jk} - \Delta_{jk}^{(y)})^2 \quad (31)$$

wherein $$\tilde{x} = \frac{b_{11}x + b_{12}y + b_{13}}{b_{31}x + b_{32}y + 1}, \quad (32)$$

$$\tilde{y} = \frac{b_{21}x + b_{22}y + b_{23}}{b_{31}x + b_{32}y + 1}.$$

The result of this minimisation is a set of perspective transform parameters $(b_{11}, b_{12}, b_{13}, b_{21}, b_{22}, b_{23}, b_{31}, b_{32})$ that represents the best fitting perspective transformation to the displacement map calculated by the block correlation step 1170. To improve the convergence of the minimisation, the initial values for the perspective parameters $(b_{11}, b_{12}, b_{13}, b_{21}, b_{22}, b_{23}, b_{31}, b_{32})$ are set from the values of the initial registration parameters 1140 through:

$$b_{11} = a_{11}$$
$$b_{12} = a_{12}$$
$$b_{13} = x_0$$
$$b_{21} = a_{21}$$
$$b_{22} = a_{22}$$
$$b_{23} = y_0$$
$$b_{31} = 0$$
$$b_{32} = 0. \quad (33)$$

Figure 15:
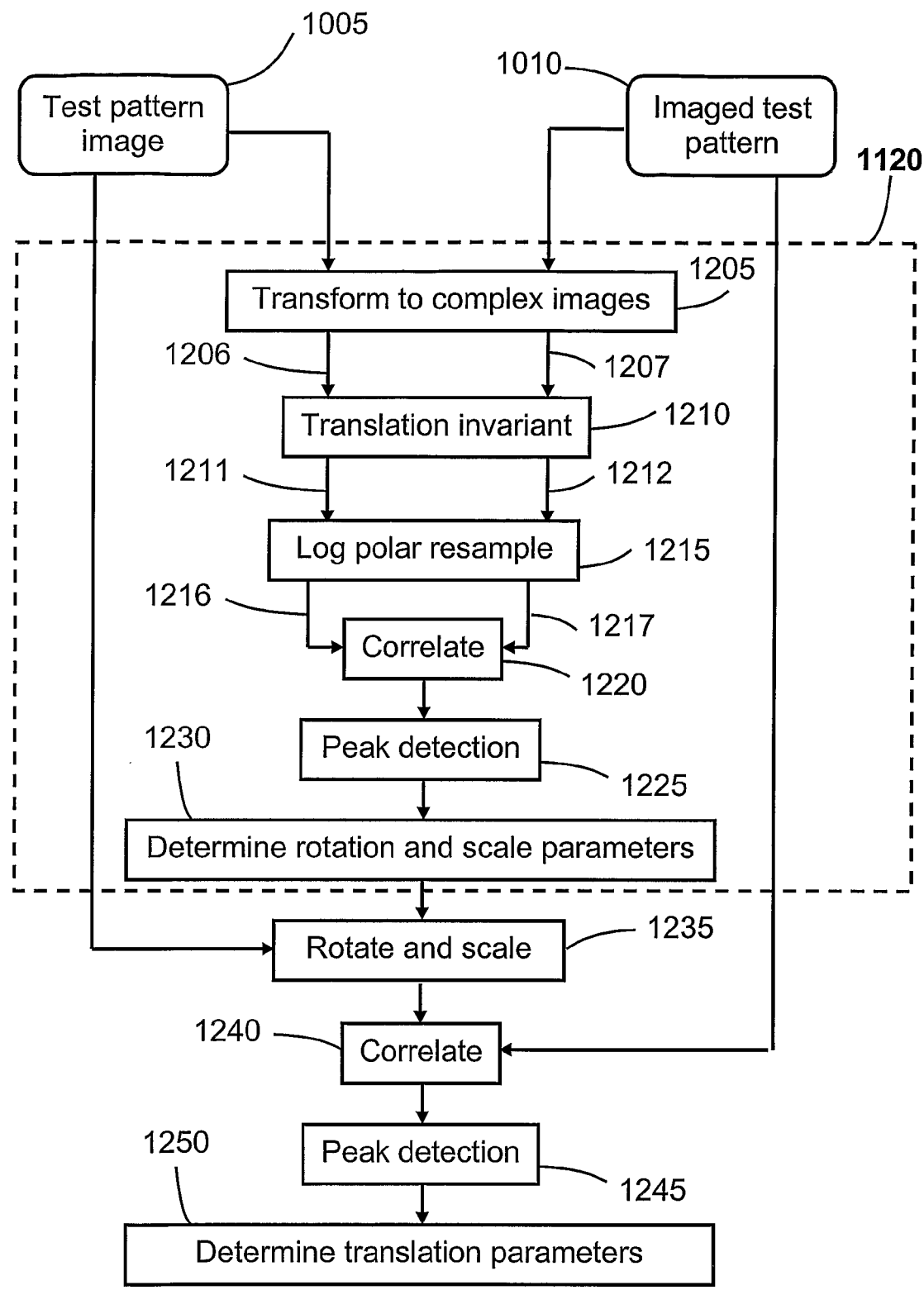
FIG. 15 shows a schematic flow diagram of rotation, scale and translation registration performed during the coarse registration shown in FIG. 14 in more detail.

FIG. 15 shows a flow diagram of the RST registration of sub-step 1120 in more detail. Sub-step 1120 starts in sub-step 1205 where the luminance channels of the test pattern image 1005 and the image 1010 formed by the imaging system under test are transformed into complex images 1206 and 1207 respectively. The complex images 1206 and 1207 have both real and imaginary parts.

Figure 16:
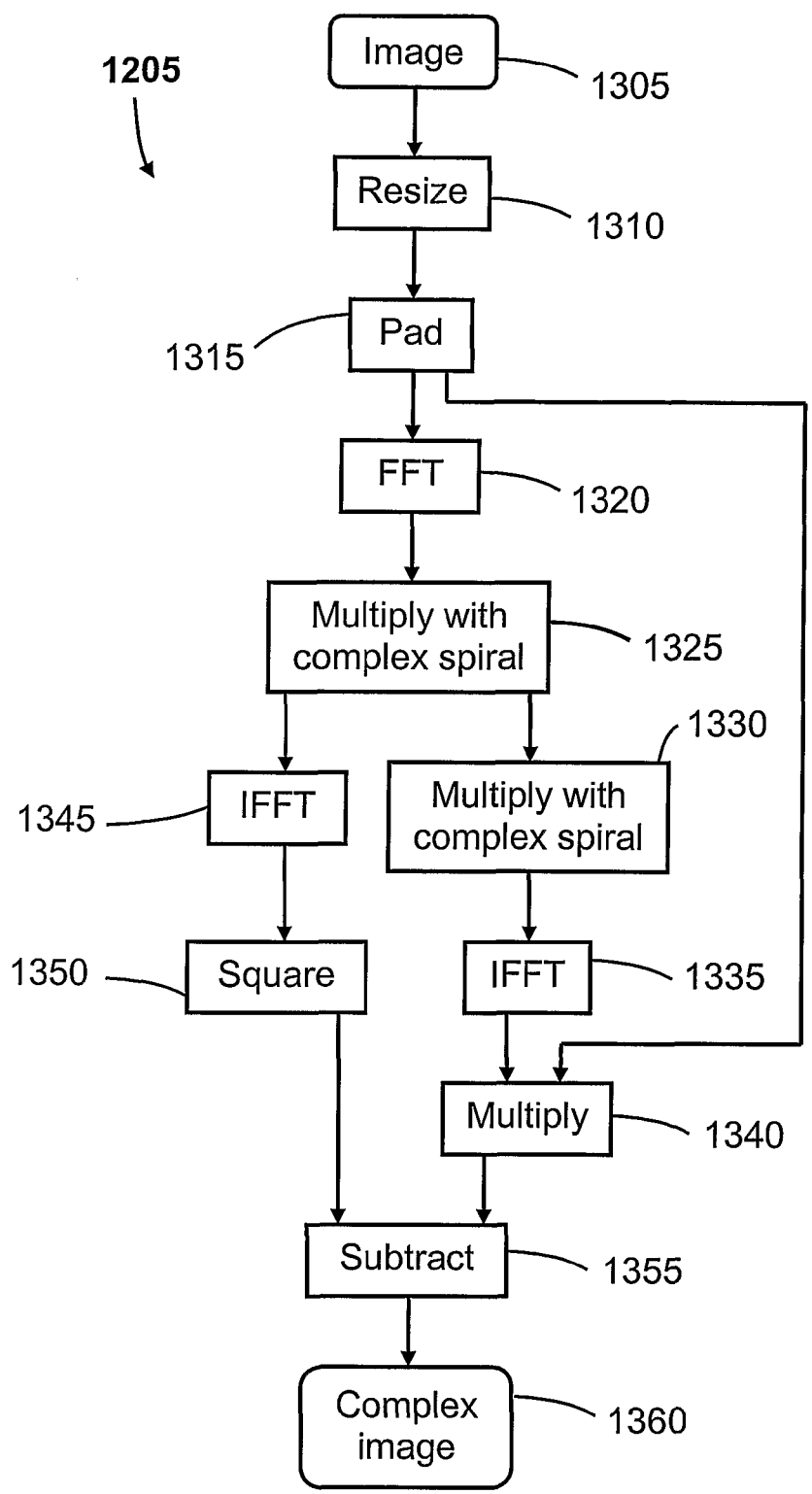
FIG. 16 shows a schematic flow diagram of transforming an image into a complex image as performed in the rotation, scale and translation registration shown in FIG. 15 in more detail.

FIG. 16 shows a flow diagram of step 1205 of transforming an image 1305 into a complex image 1360 in more detail. Image 1305 may be a test pattern image 1005 or the image 1010 formed by the imaging system under test, both of which are real images where the pixels are represented by real numbers. The complex image 1360 formed by step 1205 is one where the image pixels are represented by complex numbers.

Step 1205 operates by encoding directional features of the image 1305 in such a way that, when a translation invariant is calculated, images rotated by 180° can be distinguished.

Step 1205 starts in sub-step 1310 where the image 1305, which is an N by M array of real numbers, is resized by a process of successive halving of the image size until the minimum image dimension N or M is smaller than 512. Halving the size of an image may be done through the use of a spatial low-pass filter and down-sampling, as is known in the art. Halving the size of the image increases the speed of processing by reducing data sizes, and may, in certain circumstances, improve the quality of the measurements.

The processor 205 then pads in sub-step 1315 the resized image produced in sub-step 1310 to twice its size by inserting zeros around the boundary of the resized image. The zero-padded image formed by sub-step 1315 is then Fourier transformed in sub-step 1320 through the use of a Fast Fourier Transform (FFT). In sub-step 1325, the result of this Fourier transform is then multiplied by a complex spiral of the form:

$$S = \frac{u + iv}{\sqrt{u^2 + v^2}} \quad (34)$$

where (u,v) are Cartesian frequency coordinates in the Fourier domain with their origin at the DC offset at ($\lfloor N/2 \rfloor$, $\lfloor M/2 \rfloor$). The result of the multiplication in sub-step 1325 is then multiplied by a further complex spiral in sub-step 1330, and the result of this multiplication is then inverse Fourier transformed through an inverse FFT in sub-step 1335. The result of sub-step 1335 is then multiplied with the zero-padded image that was the result of sub-step 1315.

The processor 205 also applies an inverse FFT to the result of sub-step 1325. The result of sub-step 1345 is then squared in sub-step 1350.

Next the result of sub-step 1340 is subtracted in sub-step 1355 from the result of sub-step 1350 to form the complex image 1360. As set out above and also referring to FIG. 15, if step 1205 is applied to the test pattern image 1005, then complex image 1206 results, whereas if step 1205 is applied to image 1010, then complex image 1207.

With sub-step 1205 described in detail and referring again to FIG. 15, step 1120 continues in sub-step 1210 where the processor 205 generates from the complex images 1206 and 1207 images 1211 and 1212 that are substantially invariant to translations in the images 1005 and 1010.

Figure 17:
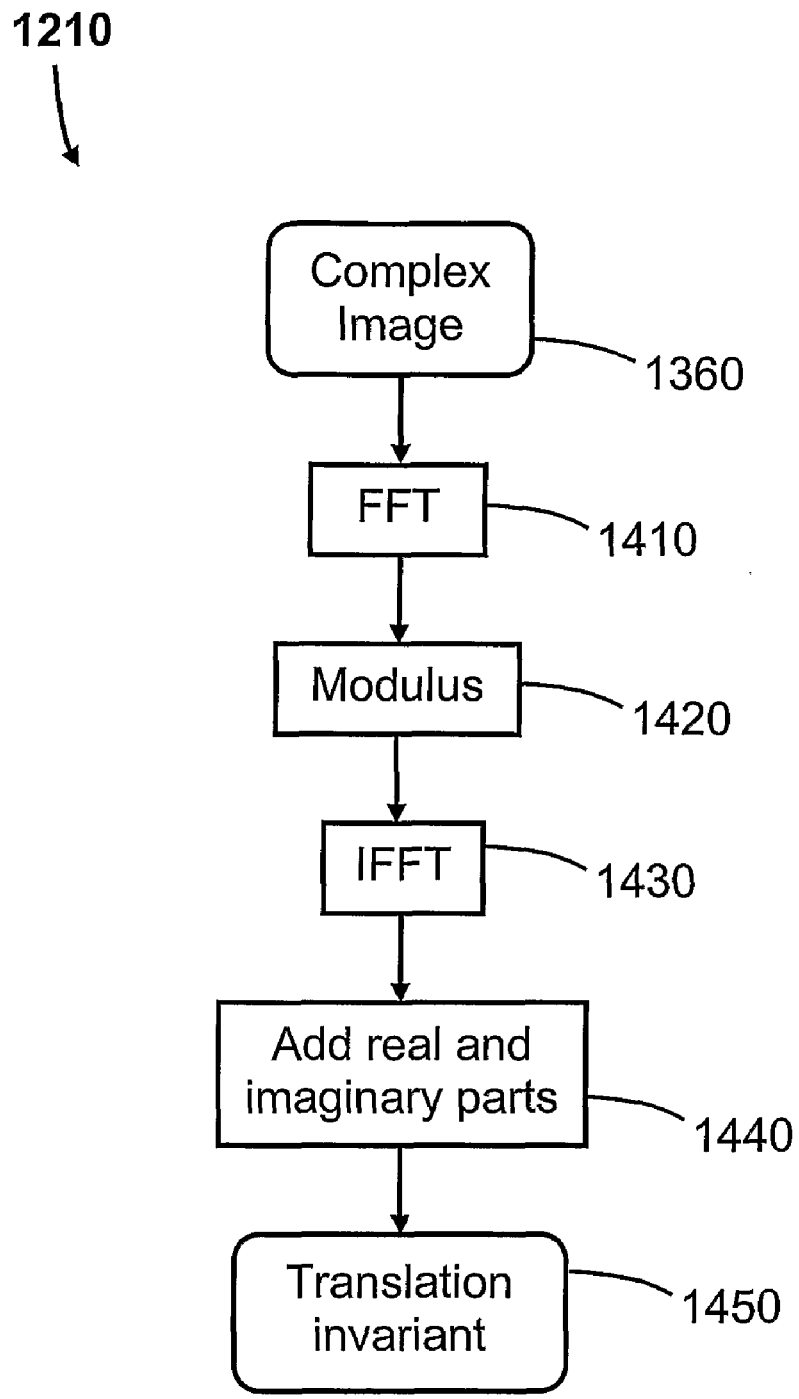
FIG. 17 shows a schematic flow diagram of generating from a complex image an image that is substantially invariant to translations as performed in the rotation, scale and translation registration shown in FIG. 15 in more detail.

FIG. 17 shows a more detailed flow diagram of sub-step 1210, which operates on complex image 1360, which may be any one of complex images 1206 or 1207 formed by the preceding sub-step 1205. Step 1210 starts in sub-step 1410 where the processor 205 applies an FFT to the complex image 1360 received as input. The result of the FFT applied in sub-step 1410 is an image with complex pixel values, and is converted in sub-step 1420 to an image having real pixel values only by taking the magnitude of each complex value. The processor 205 then applies, in sub-step 1430, an inverse FFT to the real image resulting from sub-step 1420 to produce a further complex image, which in tun is converted in sub-step 1440 to a farther real image 1450 by adding the real and imaginary parts of each pixel. If the complex image 1206 was received as input to step 1210 then the real image 1450 produced is image 1211 (FIG. 15), whereas in the case where the complex image 1207 was received as input to step 1210 then the real image 1450 produced is image 1212 (FIG. 15).

Referring again to FIG. 15, after performing sub-step 1210, sub-step 1120 continues in sub-step 1215 where the images 1211 and 1212 are resampled into a log-polar space to form images 1216 and 1217. Resampling into the log-polar space performs a mapping from a point having coordinates (x,y) in the Cartesian coordinate space to a point with coordinates (r,θ), where coordinate r corresponds to the log of the distance of Cartesian coordinates (x,y) to the origin of the Cartesian coordinate space, and θ corresponds to the angle that the point (x,y) makes with the origin. Hence:

$$r \propto \log(\sqrt{x^2 + y^2}), \text{ and} \quad (35)$$

$$\theta \propto \tan^{-1}\left(\frac{y}{x}\right). \quad (36)$$

If an image having width W and height H is resampled to the log-polar domain or space, then the coordinate r would range between $\log(\sqrt{W^2+H^2}/2)$ at the high end, and negative infinity at the low end. This is clearly not possible to realize, and it is necessary to clip the coordinate r at some small value of r. This clipping has the effect of excluding a disk of pixels from the centre of the image.

In the preferred implementation a range of log r is chosen such that a disk of radius approximately 5% of the width of the image is excluded. Such a choice gives a suitable trade-off between losing image information, and producing a log-polar resampling which contains an adequate contribution of values from all areas in the input images.

Figure 18:
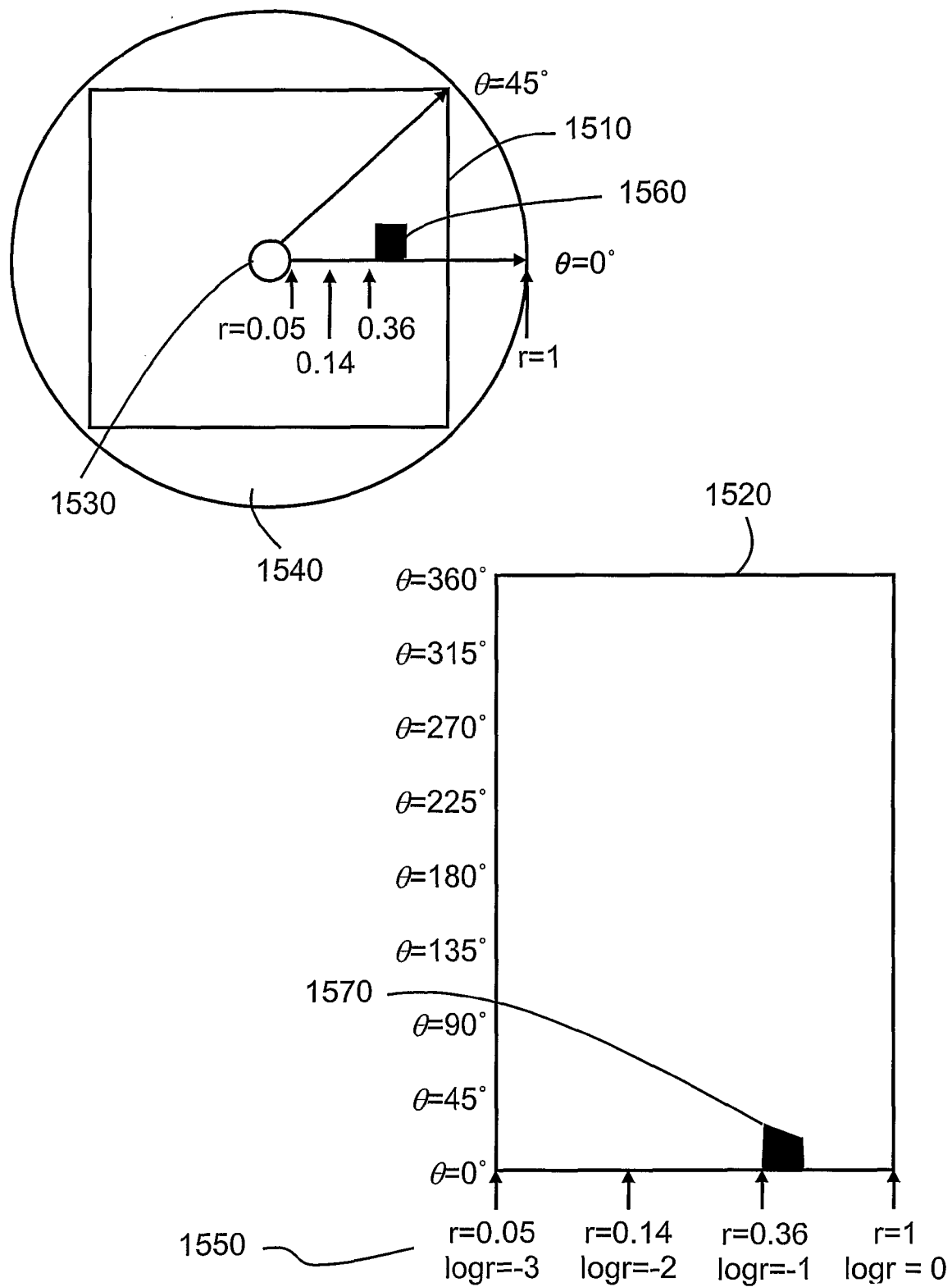
FIG. 18 illustrates some characteristics of resampling an image having Cartesian coordinates to an image in the log-polar domain.

FIG. 18 illustrates some characteristics of resampling an image 1510 having Cartesian coordinates to an image 1520 in the log-polar domain. Image 1510 is surrounded by a region 1540 which maps to zero values in image 1520. Disk 1530 contains pixels excluded from the resampling. The distance to any point in the image 1510, excluding disk 1530, and including the surrounding region 1540 from the origin ranges from 0.05 to 1. In the log-polar space that range resamples to the range −3 to 0.

Feature 1570 in image 1510 resamples to feature 1570 in the log-polar image 1520. It can be seen that approximately two-thirds of the Cartesian image (for radius r between 0.36 and 1.0) is mapped to approximately one-third of the log-polar image (for log r between −1 and 0).

Because the log-polar resampling is highly non-linear, the log-polar resampled images 1216 and 1217 (FIG. 15) are preferably created to be larger than the original Cartesian images 1211 and 1212, thereby ensuring that pixel information, other than that from the central disk, is not lost. A log-polar image in which the log-radial axis is approximately double, and the angular axis is approximately six times the width of the input image, will result in a log-polar transformation in which little information is lost due to the resampling.

Assume the width W of the input image is the larger of the two image dimensions W and H. The resampling to the log-polar domain of sub-step 1215 starts by forming an empty log-polar image with a radial axis of length X'=2W and a preferable angular axis of length Y'=6W.

The processor 205 then calculates for each pixel with coordinate (x',y') in the log-polar image an angle and radius (r,θ) in the input image as follows:

$$r = \alpha \exp(\log(R_1/\alpha) x' / X') \quad (37)$$

$$\theta = \tan^{-1} \frac{y' - \lfloor Y'/2 \rfloor}{x' - \lfloor X'/2 \rfloor} \quad (38)$$

$$\text{where } R_1 = \sqrt{W^2 + H^2}/2. \quad (39)$$

Parameter α controls the radius of the disk in the centre of the input image from which of pixels are excluded during the resampling. The preferred radius of 5% of the maximum radius, which is $R_1$, is achieved with parameter α=0.05.

The log-radius log(r) and angle θ(x,y) are then converted to Cartesian coordinates as follows:

$$x = r \cos \theta + \lfloor X/2 \rfloor \quad (40)$$

$$y = r \sin \theta + \lfloor Y/2 \rfloor. \quad (41)$$

Next the value from the input image at position (x,y) is interpolated, using bi-cubic interpolation. If the position (x,y) falls outside the original image, then a value of 0 is used. This interpolated value is the value attributed to coordinate (x',y') in the log-polar image.

Referring again to FIG. 15, the log-polar resampled images 1216 and 1217 formed by sub-step 1215 are then correlated in sub-step 1220 by the processor 205, using phase correlation. During phase correlation the FFT of a first input image, which is image 1216 in this case, is multiplied by the complex conjugate of the FFT of a second input image, which is image 1217 in this case, and the result of this multiplication is normalised to have unit magnitude. An inverse FFT is then applied to the result of the normalisation.

The result of the correlation in sub-step 1220 is an image containing a magnitude peak, the location of which represents the scale and rotation relating the images 1005 and 1010. Accordingly, peak detection is performed on the result of the correlation in sub-step 1225 in order to determine the location of the peak. Processor 205 uses the location of the peak in sub-step 1230 to determine rotation and scale parameters that relate the two images 1005 and 1010. Let the location of the peak be $(p_x, p_y)$ and let X and Y be the width and height respectively of the log-polar resampled image 1216. Coordinate $p_y$, with a range of $[0 \ldots Y-1]$, represents an angle between $-\pi/2$ radians for $p_y=0$ and $\pi/2$ radians for $p_y=Y$. Coordinate $p_x$, with a range of $[0 \ldots X-1]$, represents a scaling factor, with $p_x=0$ corresponding to a scaling factor of α, $p_x=\lfloor X/2 \rfloor$ corresponding to a scaling factor of 1, and $p_x=X$ (which does not appear in the image) corresponding to a scaling factor of 20. The preferred value of α is 0.05, though other values may be used.

From peak location $(p_x, p_y)$ the angle θ and scaling factors is derived as:

$$\theta = 2\pi(\lfloor Y/2 \rfloor - p_y)/Y \quad (42)$$

$$s = \exp(\log(\alpha(\lfloor X/2 \rfloor - p_x)\lfloor X/2 \rfloor)) \quad (43)$$

Processor 205 then uses the rotation and scale parameters to rotate and scale the test pattern image 1005 in sub-step 1235, using bi-cubic interpolation. Images 1005 and 1010 now have the same orientation and scale. The result of sub-step 1235 is then correlated with the imaged test pattern 1010 in sub-step 1240, again using phase con-elation as described above. In sub-step 1245 the processor 205 performs peak detection on the result of the correlation in sub-step 1240. The location of the peak is used by the processor 205 in sub-step 1250 to determine the translation parameters $(x_0, y_0)$ that relate images 1005 and 1010. Let $(p_x, p_y)$ be the location of the peak detected in step 1245, then the translation parameters $(x_0, y_0)$ are:

$$x_0 = \lfloor N/2 \rfloor - p_x \quad (44)$$

$$y_0 = \lfloor M/2 \rfloor - p_y \quad (45)$$

where N and M are the width and height respectively of the test pattern image 1010.

Figure 19:
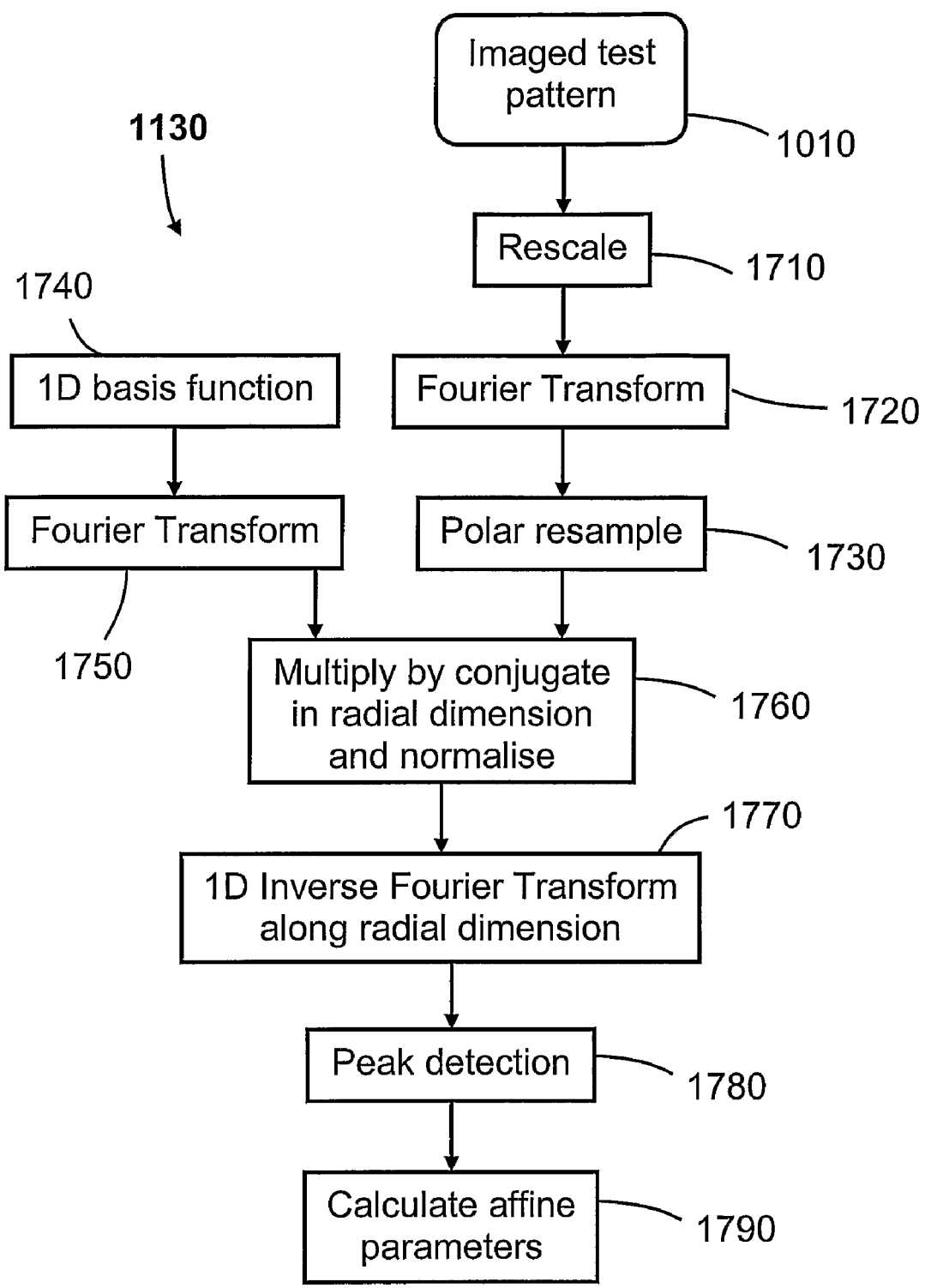
FIG. 19 shows a schematic flow diagram of invariant pattern detection performed during the coarse registration shown in FIG. 14 in more detail.

Referring again to FIG. 14, sub-step 1130 where invariant pattern detection is performed is now described in more detail with reference to FIG. 19. As set out above, sub-step 1130 is performed if the test pattern includes an alignment pattern. Sub-step 1130 starts in sub-step 1710 where the luminance channel of image 1010 is resized by a process of successive halving until the resultant image is sized such that the smallest of the width and height is in the range 256 to 511 pixels. Sub-step 1710 is performed to improve the efficiency of the steps that follow. The successive halving may be performed by convolving the image with a low-pass filter and decimating the result of the convolution. The processor 205 then performs a two-dimensional FFT in sub-step 1720 on the resulting resized image.

Preferably, before computing the FFT in sub-step 1720, the image luminance values near the image edges are first attenuated so that the image luminance values fade to zero gradually and smoothly towards the edges of the rescaled image. The attenuation of luminance values at the edges of the rescaled image removes artefacts typically formed by the FFT.

Step 1130 continues in sub-step 1730 where the processor 205 resamples the result from step 1720 into a quasi-polar frequency space. A complex image is produced wherein horizontal rows thereof correspond to radial slices in the two-dimensional FFT that resulted from sub-step 1720. The angular spacing and the radial scaling need not be constant. This may be achieved by a direct polar transform of the two-dimensional FFT which resamples the FFT onto a polar grid using bi-cubic interpolation. Whilst simple, this method produces artefacts which can adversely affect detection of the embedded alignment pattern. The preferred method of performing sub-step 1730 is described below.

The invariant pattern detection step 1130 continues in sub-step 1750 where a one-dimensional Fourier transform of the one-dimensional basis function is performed, with the basis function being the function from which the one-dimensional scale invariant patterns embedded into the test pattern image 1005 are formed, such as the basis function given by Equation (1). Alternatively, the basis function may be mathematically transformed.

Next, the transform of the basis function resulting from sub-step 1750 is multiplied in a pixel by pixel fashion in sub-step 1760 with the complex conjugate of the values of the output of sub-step 1730 along horizontal rows for all angle values. Values along horizontal rows represent radial lines in the two-dimensional FFT. The complex pixel values resulting from sub-step 1760 are then normalized by the processor 205 so that the pixel values have unit magnitude. Sub-step 1770 follows where the one-dimensional IFFT is performed on the output of step 1760 along horizontal rows. The result of sub-step 1770 is a complex image with peaks in its magnitude at locations corresponding to the orientations and scales of the one-dimensional basis functions within the image 1010. The processor 205 in sub-step 1780 detects such peaks in the manner described in more detail below with reference to FIG. 25.

Finally, in sub-step 1790 the locations of 4 of the peaks detected in sub-step 1780 are used to determine the affine parameters that relate the images 1050 and 1010. In particular, the affine transformation described by linear transformation parameters $(a_{11},a_{12},a_{21},a_{22},x_0,y_0)$ that maps the original set of one-dimensional basis function parameters, those being radius $r_i$ and angle $\alpha_i$, to radius $s_i$ and angle $\beta_i$, is determined from the 4 selected peaks.

The processor 205 does so by first sorting the peaks detected in sub-step 1780 into order of their magnitude. The peaks are also filtered such that peaks that are within 10 pixels of a peak with a higher magnitude is removed from the list of peaks. The remaining top 64 peaks, if that many exist, are then farther processed by selecting in turn each possible combination of 4 peaks and performing the following analysis, keeping track of which combination of 4 peaks best satisfies the conditions of this analysis. The radius $s_i$ and angle $\beta_i$ of each peak are computed from the (x,y) offset of that peak in the quasi-polar map as follows:

The input image is of size (W,X'+Y') pixels. Let $$Y_2 = \lfloor Y/2 \rfloor \tag{46}$$
$$X_2 = \lfloor X/2 \rfloor$$
$$W_2 = \lfloor W/2 \rfloor$$

If $y < Y'$, then:

$$y_s = y - Y_2$$
$$x_s = x - W_2$$

$$\beta_i = \pi/2 - \tan^{-1}\frac{Y_2}{y_s} \tag{47}$$

$$s_i = \frac{x_s Y_2}{\sqrt{Y_2^2 + y_s^2}}$$

else if $y >= Y'$, $$y_s = x - W_2$$
$$x_s = y - X_2$$

$$\beta_i = \pi - \tan^{-1}\frac{X_2}{x_s} \tag{48}$$

$$s_i = \frac{y_s X_2}{\sqrt{X_2^2 + x_s^2}}$$

As mentioned with reference to Equation (4), the set of preferred parameters $r_i$ and $\alpha_i$ has been specially chosen so that the axes of symmetry of the one-dimensional basis functions they represent intersect at points that define line segments that have certain ratios of lengths. As the ratios of lengths are invariant under affine transformations, the first condition which the combination of 4 peaks must satisfy is that line segments generated therefrom should have ratios of lengths that correspond to those of the axes of symmetry of the patterns embedded. In the case where the ratios of lengths do not correspond to those of the axes of symmetry of the patterns embedded the combination of peaks cannot correspond to the four original basis patterns modified by an affine transform and this combination is discarded.

As previously described, the radial and angular coordinates of a peak, $s_i$ and $\beta_i$, describe the axis of symmetry of one of the one-dimensional scale invariant patterns embedded in the test pattern. Rather than determine the affine transform applied to the test pattern image 1005 through the changes in these line parameters directly, the affine transform is determined from the intersection points of the 4 axes of symmetries specified by the 4 selected peaks. The intersection of two axes of symmetry represented by parameters $\{s_k,\beta_k\}$ and $\{s_m,\beta_m\}$ is labelled $(x_{km},y_{km})$, and is given by the matrix equation:

$$\begin{pmatrix} x_{km} \\ y_{km} \end{pmatrix} = \frac{1}{\sin(\beta_k - \beta_m)} \begin{pmatrix} \sin\beta_k & -\sin\beta_m \\ \cos\beta_k & \cos\beta_m \end{pmatrix} \begin{pmatrix} s_m \\ s_k \end{pmatrix}. \tag{49}$$

Clearly there is no intersection if the lines are parallel, and so the equivalent constraint $\sin(\beta_k-\beta_m) \neq 0$ is imposed. In practical situations $\sin^2(\beta_k-\beta_m) \geq 0.25$ is sufficient to ensure good localization of the intersection point $(x_{km},y_{km})$. Now, the parametric equation of a line specifies the linear distance of any point on that line relative to the perpendicular bisector of that line that passes through the origin. In the current case of four mutually non-parallel lines, each line has three intersection points along its length and the ratio of the intersection intervals remains invariant to affine distortions. The distance $\lambda_{km}$, along the $k^{th}$ line where the $m^{th}$ line intersects, is given by $$\lambda_{km} = \frac{s_k \cos(\beta_k - \beta_m) - s_m}{\sin(\beta_k - \beta_m)}. \tag{50}$$

The above equation is then enumerated for all combinations $\lambda_{km}$ for $k \neq m$ and a table generated which contains the locations along lines:

$$\begin{bmatrix} - & \lambda_{12} & \lambda_{13} & \lambda_{14} \\ \lambda_{21} & - & \lambda_{12} & \lambda_{24} \\ \lambda_{31} & \lambda_{32} & - & \lambda_{34} \\ \lambda_{41} & \lambda_{42} & \lambda_{43} & - \end{bmatrix} \tag{51}$$

At this stage it is useful to order the parameters by size $\{\lambda_{km}\}_{max} > \{\lambda_{km}\}_{mid} > \{\lambda_{km}\}_{min}$, $m=1 \to 4$ of each line $k$, and find the length ratios $R_k'$:

$$R_k' = \min\left[\frac{\{\lambda_{km}\}_{max} - \{\lambda_{km}\}_{mid}}{\{\lambda_{km}\}_{mid} - \{\lambda_{km}\}_{min}}, \frac{\{\lambda_{km}\}_{mid} - \{\lambda_{km}\}_{min}}{\{\lambda_{km}\}_{max} - \{\lambda_{km}\}_{mid}}\right] \leq 1 \tag{52}$$

This generates 4 ratios from the 4 axes of symmetry. There are also 4 ratios that may be generated from the original set of one-dimensional basis function parameters $r_i$ and $\alpha_i$. If we denote these ratios as $R_k$ then we define the error in the ratio measure for the selected set of 4 peaks as:

$$E_{ratio} = \sqrt{\sum_{j=1}^{4} (R_k'/R_k - 1)^2}. \tag{53}$$

If the error $E_{ratio}$ is greater than 0.1 the set of peaks is discarded. Alternatively, if the error $E_{ratio}$ is less than 0.1, then the processor 205 applies a linear least squares fitting model to determine the best fitting affine transform that maps the set of intersection points of the axes of symmetry generated by the 4 selected peaks back to the original set of intersection points of the axes of symmetry of the embedded pattern.

Figure 20:
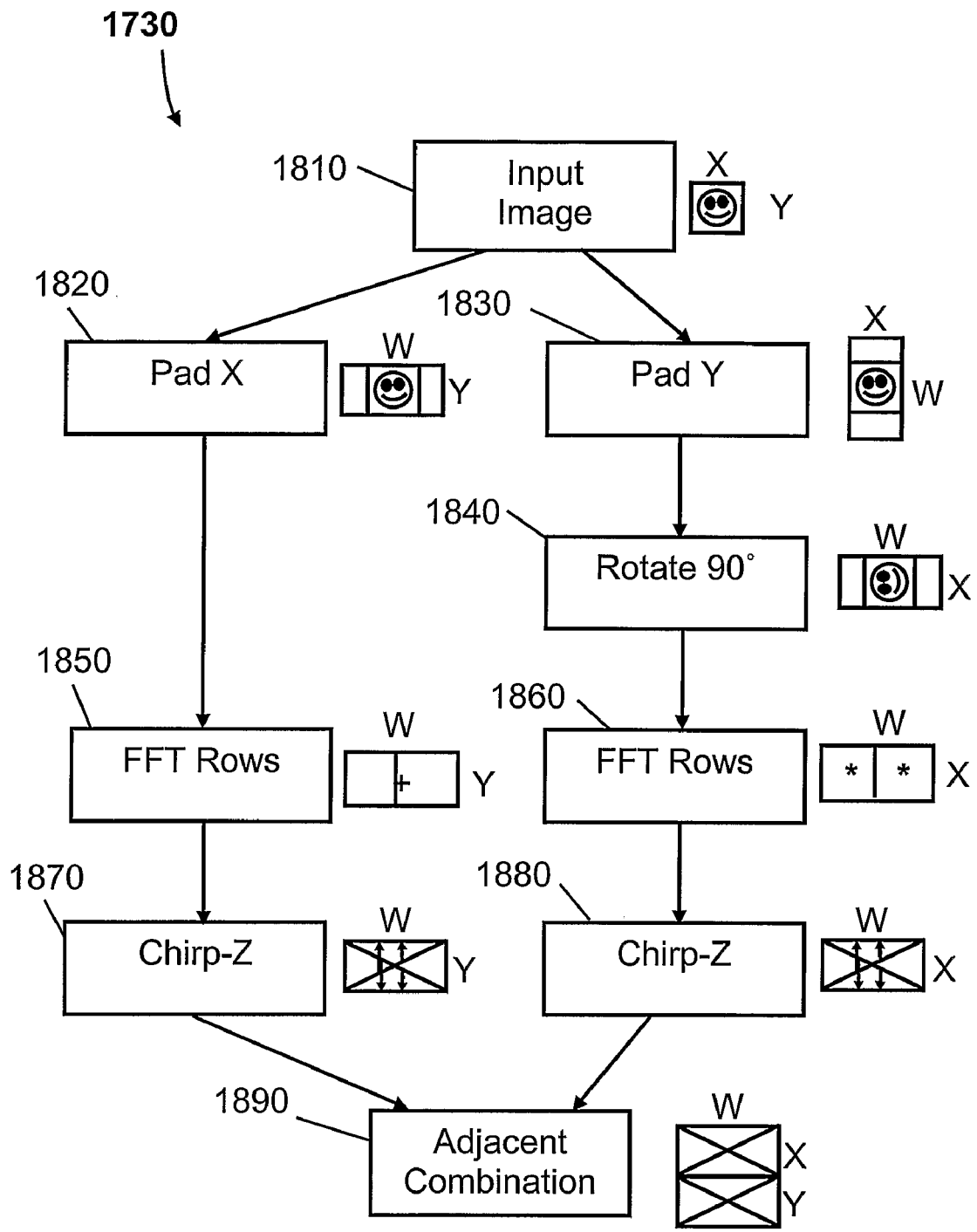
FIG. 20 shows a schematic flow diagram of the preferred method of resampling a Fourier Transform into a quasi-polar frequency space.

The preferred method of performing sub-step 1730 (FIG. 19), that is resampling the result from step 1720 into a quasi-polar frequency space, is now described in more detail with reference to FIG. 20. Sub-step 1730 starts in sub-step 1810 where the processor 205 replicates the input image (the result from step 1720), having size (X',Y'), into two copies. In sub-step 1820, the first copy is padded with zeros in the X direction to a width of W=2*MAX(X',Y'), resulting in an image of size (W,Y'). The padding is performed so that column offset $\lfloor X'/2 \rfloor$ in the first copy corresponds to column offset $\lfloor W/2 \rfloor$ in the padded image.

Also, in sub-step 1830, the second copy is padded with zeros in the Y direction to a height of W. The padding is performed so that row offset $\lfloor Y'/2 \rfloor$ in the second copy corresponds to row offset $\lfloor W/2 \rfloor$ in the padded image. Sub-step 1830 is followed by sub-step 1840 where the padded image resulting from sub-step 1830 is rotated by 90 degrees, resulting in an image of size (W,X').

In sub-steps 1850 and 1860 the results from sub-steps 1820 and 1840 respectively are transformed by the processor 205 by computing the one-dimensional Fourier transform is of each row.

This is followed by sub-steps 1870 and 1880 where the results from sub-steps 1850 and 1860 respectively are transformed by the processor 205 by computing individual chirp-Z transforms on each of the columns. Each chirp-Z transform is performed to preserve the centre position of each column, at positions $\lfloor Y'/2 \rfloor$ and $\lfloor X'/2 \rfloor$ within the columns of the results from sub-steps 1870 and 1880.

The scaling factors $m_z$ for each column z in the results from sub-steps 1870 and 1880 respectively are:

$$m_z = \lfloor W/2 \rfloor/(z - \lfloor W/2 \rfloor) \tag{54}$$

Each scale factor $m_z$ is negative for $z < \lfloor W/2 \rfloor$, corresponding to a vertical flip. Where the scaling factor is undefined for $z = \lfloor M/2 \rfloor$, the central pixel position is replicated across the whole column.

Assuming a square image, the results from sub-steps 1870 and 1880 represent quasi-polar transforms of the Fourier Transforms of the resized, windowed input image, with the result from sub-step 1870 having angles within the range $[-\pi/4 \ldots 3\pi/4]$, and the result from sub-step 1880 having angles in the range $[\pi/4 \ldots 3\pi/4]$. If the input image is rectangular, the angular ranges will be from $[-\text{atan2}(Y',X') \ldots \text{atan2}(Y',X')]$ and $[\text{atan2}(Y',X') \ldots \pi-\text{atan2}(Y',X')]$. Because each row of the quasi-polar transform contains positive and negative radii, it has all angles within $[0 \ldots 2\pi]$ radians.

Sub-step 1730 ends in sub-step 1890 where the processor 205 combines the images resulting from sub-steps 1870 and 1880 to form an output image of dimension (W,Y'+X') by replicating the pixels of the image resulting from sub-step 1870 into the top part of the output image and replicating the pixels of the image resulting from sub-step 1880 into the bottom part of the output image.

Figure 25:
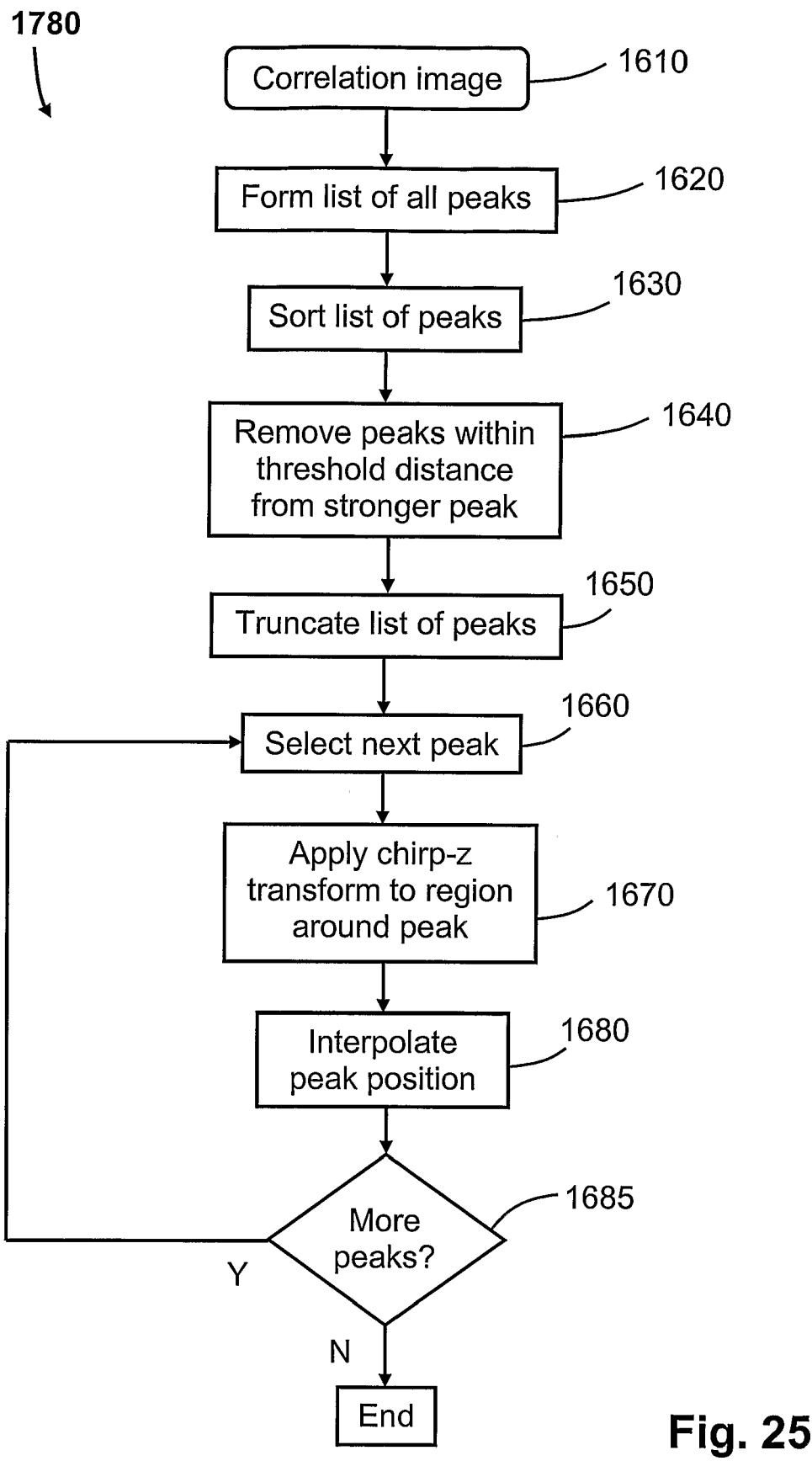
FIG. 25 shows a schematic flow diagram of the steps for detecting positions of peaks in a correlation image.

The peak detection performed in sub-steps 1225 (FIG. 15), 1245 (FIG. 15) and 1780 (FIG. 19) is now described in more detail with reference to FIG. 25 where a flow diagram of a method of performing peak detection on a correlation image 1610 is shown in more detail. Correlation image 1610 may be a real image or complex image. Step 1780 starts in sub-step 1620 where the processor 205 forms a list of peaks in the correlation image 1610, that is all points in the correlation image 1610 where the magnitude of the point is larger than neighbouring points. In sub-step 1630 the points are sorted in order of the magnitude of the pixel value.

However, peaks may occur in noisy regions, causing many peaks to be clustered close together. In the case of sub-step 1780, the manner in which the parameters of the embedded patterns were chosen establishes that there should be only one peak in any one region. Also, in the case of sub-steps 1225 and 1245 only one peak should exist in the correlation image 1610. Accordingly, only the largest peak within a certain radial threshold is considered, with a preferred radial threshold being 10 pixels. In sub-step 1640 each peak in the sorted list is considered in decreasing order of its magnitude, and any peak in the list that is lower in the list (smaller magnitude) and within the radial threshold of the peak being considered is removed from the list.

In sub-step 1650 that follows the processor 205 truncates the sorted list of peaks to a length equal to the number of peaks that are expected. In the case of sub-step 1780 this is the number of alignment patterns embedded into the test pattern, which is 4 in the preferred implementation. In the case of sub-steps 1225 and 1245 there should be only one peak. The positions of these peaks are to be determined with high precision. In sub-step 1660 a next peak is selected. In sub-step 1670 the processor 205 inputs a 27 by 27 region centred on the location of the peak being considered to an FFT, followed by a chirp-z transform which zooms in on the peak by a factor of 27. The chirp-z transform allows computation of the discrete Fourier transform (DFT or the inverse DFT) with arbitrary spacing. The method works by expressing the DFT as a discrete, cyclic convolution. Because such convolutions can be implemented using FFTs it is possible for the entire computation to take advantage of the FFT speed. By suitable choice of spacing, the chirp-z transform becomes an interpolation technique, so that, for example, a DFT is finely sampled (that is to say zoomed) over a selected region.

The pixel in this 27 by 27 image with the highest magnitude is determined in sub-step 1680, and the sub-pixel location of this peak is determined using a biparabolic fit. This sub-pixel accurate peak location is the output of the peak detection step.

In sub-step 1685 the processor 205 determines whether more peaks are to be processed. If more peaks exist, then step 1780 returns to sub-step 1660 from where the next peak is selected and processed. Alternatively step 1780 ends.

The foregoing describes only some embodiments of the present invention, and modifications and/or changes can be made thereto without departing from the scope and spirit of the invention, the embodiments being illustrative and not restrictive.

For example, in the implementation(s) described above the luminance channels of the test pattern image 1005 and imaged test pattern 1010 are used for registration. However, some other combination of channels may be used, such as the chrominance, or each single channel separately, such as the red, green or blue channel.

It is sometimes desirable to pad the test pattern images 1005 with a colour that is similar to that of the material on which the test chart 110, 150, or 170 has been fabricated or printed. For instance, if the test chart 110, 150, or 170 is printed on white paper, the test pattern images 1005 may be surround by an area of white pixels to allow registration of the images right to the edge of the image.

Furthermore, the correlation performed between blocks in the block based correlation (step 1035) is described as single channel correlation. Two colour channels of the images 1030 and 1010 may be used as real and imaginary parts of a complex image and complex phase correlation is then performed between the (complex) blocks.

Also in the implementation of the block based correlation step 1035, the blocks selected for correlation are overlapping and evenly spaced. Non-overlapping blocks, or variably spaced and sized blocks may be used. Yet a further variation is to use non-square blocks.

Yet another modification to the block based correlation step 1035 is to, before the blocks are correlated, decimate or scale the images 1030 and 1010 to reduce the amount of computation necessary to perform the correlation step.

Multiple application of the block based correlation step 1035 may be performed, where the warped test pattern image 1055 replaces the coarsely registered test pattern image 1030 as the input to subsequent block based correlation steps. The distortion maps so formed are then combined through composition and bi-cubic interpolation. This allows the application of the block based correlation step at multiple block sizes and step sizes to produce even better registration results at the cost of additional computation.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A method of measuring performance parameters of an imaging device, said method comprising the steps of:

maintaining a test pattern image, said test pattern image comprising alignment features and image analysis features;

imaging a test chart using said imaging device to form a second image, said test chart containing a representation of said test pattern image;

registering said test pattern image and said second image using region based matching operating on said alignment features; and measuring said performance parameters by analysing said image analysis features.

2. The method as claimed in claim 1, wherein said imaging device is a camera, and said test chart is a self-luminous device displaying said test pattern image.

3. A method of measuring performance parameters of a printer, said method comprising the steps of:

maintaining a test pattern image, said test pattern image comprising alignment features and image analysis features;

printing said test pattern image using said printer to form a test chart;

imaging said test chart using a calibrated imaging device to form a second image;

registering said test pattern image and said second image using region based matching operating on said alignment features; and measuring said performance parameters by analysing said image analysis features.

4. The method as claimed in any one of claims 1 and 3, wherein said region based matching uses overlapping blocks of image data from said test pattern image and said second image.

5. The method as claimed in any one of claims 1 and 3, wherein said analysis features are said alignment features.

6. The method as claimed in any one of claims 1 and 3, wherein said region based matching is block based correlation.

7. The method as claimed in any one of claims 1 and 3, wherein said registering step comprises the sub-steps of:

performing block based correlation on said test pattern image and said second image to determine a displacement map for mapping pixels of said test pattern image to corresponding pixels of said second image;

interpolating said displacement map to form a distortion map; and warping said test pattern image using said distortion map.

8. The method as claimed in any one of claims 1 and 3, wherein said measuring step includes comparing pixel values of corresponding pixels in said test pattern image and second image after said images have been registered.

9. The method as claimed in any one of claims 1 and 3, wherein said test pattern image is generated by the steps of:

(a) dividing an image area into a predetermined number of areas;
   (b) dividing each of said areas into smaller areas;
   (c) within each area, assigning properties to at least one of said smaller areas, and designating the remainder of said smaller areas as areas;
   (d) generating pixel values for said at least one of said smaller areas, said pixel values being in accordance with said properties; and
   (e) repeating steps (b) to (d).

10. The method as claimed in claim 9, wherein said properties are randomized.

11. The method as claimed in claim 9, wherein said at least one of said smaller areas is selected randomly.

12. The method as claimed in claim 9, wherein said properties are one or more of:
colour;
slowly varying colour;
pattern with predetermined frequency distribution;
pattern with predetermined orientations; and
pseudo-random noise.

13. The method as claimed in claim 9, wherein a test pattern corresponding to said test pattern image is a dyadic test pattern.

14. A method as claimed in claim 1, wherein said test pattern image is generated through the steps of:
(a) dividing an area into a predetermined number of smaller areas;
(b) selecting at least of said smaller areas;
(c) generating pixel values for the selected smaller areas, said pixel values being in accordance with assigned properties;
(d) designating each of the unselected smaller areas as areas; and
(e) repeating steps (a) to (d) iteratively for each of the areas.

15. The method as claimed in claim 14, wherein said properties are randomized.

16. The method as claimed in claim 14, wherein said at least one of said smaller areas is selected randomly.

17. The method as claimed in claim 14, wherein said properties are one or more of:
colour;
slowly varying colour;
pattern with predetermined frequency distribution;
pattern with predetermined orientations; and
pseudo-random noise.

18. The method as claimed in any one of claims 1 and 3, wherein different colour channels in said test pattern image and said second image are separately registered and analysed.

19. Apparatus for measuring performance parameters of an imaging device, said apparatus comprising:
means for maintaining a test pattern image, said test pattern image comprising alignment features and image analysis features;
means for receiving a second image, said second image being an image captured by said imaging device of a test chart, and said test chart containing a representation of said test pattern image;
means for registering said test pattern image and said second image using region based matching operating on said alignment features; and
means for measuring said performance parameters by analysing said image analysis features.

20. Apparatus as claimed in claim 19 wherein said means for maintaining a test pattern image comprises:
means for dividing an area into a predetermined number of smaller areas;
means for selecting at least one of said smaller areas;
means for generating pixel values for the selected smaller areas, said pixel values being in accordance with assigned properties;
means for designating each of the unselected smaller areas as areas; and
means for iteratively passing control to said means for dividing, said means for selecting, said means for generating pixel values, and said means for designating.

21. Apparatus for measuring performance parameters of a printer, said apparatus comprising:
means for maintaining a test pattern image, said test pattern image comprising alignment features and image analysis features;
said printer for printing said test pattern image to form a test chart;
a calibrated imaging device for imaging said test chart to form a second image;
means for registering said test pattern image and said second image using region based matching operating on said alignment features; and
means for measuring said performance parameters by analysing said image analysis features.

22. A non-transitory computer-readable medium storing a computer program for measuring performance parameters of an imaging device, said computer program when executed on a computing device performing the steps of:
maintaining a test pattern image, said test pattern image comprising alignment features and image analysis features;
imaging a test chart using said imaging device to form a second image, said test chart containing a representation of said test pattern image;
registering said test pattern image and said second image using region based matching operating on said alignment features; and
measuring said performance parameters by analysing said image analysis features.

23. A non-transitory computer-readable medium storing a computer program for measuring performance parameters of a printer, said computer program when executed on a computing device performing the steps of:
maintaining a test pattern image, said test pattern image comprising alignment features and image analysis features;
printing said test pattern image using said printer to form a test chart;
imaging said test chart using a calibrated imaging device to form a second image; registering said test pattern image and said second image using region based matching operating on said alignment features; and
measuring said performance parameters by analysing said image analysis features.

24. A non-transitory computer-readable medium as claimed in claim 22, wherein said test pattern image is generated through the steps of:
(a) dividing an image area into a predetermined number of smaller areas;
(b) selecting at least one of said smaller areas;
(c) generating pixel values for the selected smaller areas, said pixel values being in accordance with assigned properties;
(d) designating each of the unselected smaller areas as areas; and
(e) repeating steps (a) to (d) iteratively for each of the areas.

* * * * *